US011513637B2

(12) United States Patent
    Ikeda

(10) Patent No.: US 11,513,637 B2
(45) Date of Patent: Nov. 29, 2022

(54) IMAGE PROJECTION DEVICE

(71) Applicant: Hiroyuki Ikeda, Tokyo (JP)

(72) Inventor: Hiroyuki Ikeda, Tokyo (JP)

( * ) Notice: Subject to any disclaimer, the term of this patent is extended or adjusted under 35 U.S.C. 154(b) by 135 days.

(21) Appl. No.: 16/072,436

(22) PCT Filed: Nov. 1, 2016

(86) PCT No.: PCT/JP2016/082469
    § 371 (c)(1),
    (2) Date: Jul. 24, 2018

(87) PCT Pub. No.: WO2017/130504
    PCT Pub. Date: Aug. 3, 2017

(65) Prior Publication Data
    US 2019/0034033 A1    Jan. 31, 2019

(30) Foreign Application Priority Data
    Jan. 25, 2016   (JP) .............................. JP2016-011926

(51) Int. Cl.
    *G06F 3/042*      (2006.01)
    *G06T 7/73*       (2017.01)
    (Continued)

(52) U.S. Cl.
    CPC .......... *G06F 3/0425* (2013.01); *G03B 21/62* (2013.01); *G06F 3/0354* (2013.01); *G06F 3/041* (2013.01);
    (Continued)

(58) Field of Classification Search
    CPC ........ G06F 3/0425; G06F 3/017; G06F 3/042; G06F 3/0426; G06F 3/0428;
    (Continued)

(56) References Cited

U.S. PATENT DOCUMENTS 5,982,352 A * 11/1999 Pryor ........................ G01S 5/16
                                                               345/156
2001/0030668 A1   10/2001 Erten et al.
(Continued)

FOREIGN PATENT DOCUMENTS

EP    1 837 743 A2    9/2007
ER    2 648 082 A2    10/2013
(Continued)

OTHER PUBLICATIONS

International Search Report (PCT/ISA/210) issued in PCT Application No. PCT/JP2016/082469 dated Jan. 31, 2017 with English Translation (five (5) pages).
(Continued)

*Primary Examiner* — Lixi C Simpson
(74) *Attorney, Agent, or Firm* — Crowell & Moring LLP

(57) ABSTRACT

An image projection device which can correctly discern content of touch operation when a user performs various kinds of touch operation on an image projected on a projection screen is provided. An imaging unit is adjusted to come into focus on the projection screen. An image data extracting unit extracts image data in which a finger or the like exists and in which the finger or the like is brought into focus in image data obtained by the imaging unit. An operation determining unit determines content of operation performed with the finger or the like, on the basis of the image data extracted by the image data extracting unit. An input control unit recognizes content of an input instruction corresponding to the operation performed with the finger or the like, on the basis of data relating to the content of the operation performed with the finger or the like, position data of the finger or the like, and reference data for specifying a position and a size of the image projected on the projection (Continued)

screen, and controls a projection unit in accordance with the recognized content of the input instruction.

17 Claims, 13 Drawing Sheets

(51) Int. Cl.
| | | |
|---|---|---|
| *G06T 7/90* | (2017.01) | |
| *G06T 7/50* | (2017.01) | |
| *G06F 3/0354* | (2013.01) | |
| *H04N 9/31* | (2006.01) | |
| *G03B 21/62* | (2014.01) | |
| *G06F 3/041* | (2006.01) | |
| *H04N 5/232* | (2006.01) | |

(52) U.S. Cl.
CPC ............... *G06F 3/042* (2013.01); *G06T 7/50* (2017.01); *G06T 7/73* (2017.01); *G06T 7/90* (2017.01); *H04N 9/3141* (2013.01); *G06T 2207/30204* (2013.01); *H04N 5/23212* (2013.01)

(58) Field of Classification Search
CPC ............ G06F 1/1639; G10H 2220/455; G06K 9/00355; G06K 9/00375; H04N 9/31
See application file for complete search history.

(56) References Cited

U.S. PATENT DOCUMENTS

| | | | |
|---|---|---|---|
| 2005/0162381 A1* | 7/2005 | Bell .................. | G06F 3/0425 345/156 |
| 2007/0216644 A1 | 9/2007 | Nam et al. | |
| 2009/0167682 A1* | 7/2009 | Yamashita ......... | G06F 3/03547 345/158 |
| 2011/0164191 A1 | 7/2011 | Brown | |
| 2012/0194738 A1* | 8/2012 | Wang .................. | G06F 1/1632 348/552 |
| 2012/0262420 A1 | 10/2012 | Sobel et al. | |
| 2012/0281100 A1 | 11/2012 | Tan et al. | |
| 2013/0234963 A1 | 9/2013 | Yu et al. | |
| 2014/0253511 A1* | 9/2014 | Yagishita ............ | G06F 3/0425 345/175 |
| 2015/0009138 A1 | 1/2015 | Narita et al. | |
| 2015/0120789 A1 | 4/2015 | Wang | |
| 2015/0220152 A1* | 8/2015 | Tait ..................... | G06F 3/017 345/156 |
| 2017/0285875 A1* | 10/2017 | Hasuike ............... | G03B 21/00 |
| 2018/0210597 A1* | 7/2018 | Touyama ............. | G06F 3/04886 |

FOREIGN PATENT DOCUMENTS

| | | |
|---|---|---|
| GB | 2 377 607 A | 1/2003 |
| JP | 2007-257639 A | 10/2007 |
| JP | 2011-118533 A | 6/2011 |
| JP | 2012-150837 A | 8/2012 |
| JP | 2013-80430 A | 5/2013 |
| JP | 2015-14882 A | 1/2015 |
| JP | 2015-106111 A | 6/2015 |

OTHER PUBLICATIONS

Japanese-language Written Opinion (PCT/ISA/237) issued in PCT Application No. PCT/JP2016/082469 dated Jan. 31, 2017 (four (4) pages).
Japanese-language International Preliminary Report on Patentability (PCT/IPEA/409) issued in PCT Application No. PCT/JP2016/082469 dated Sep. 29, 2017 (five (5) pages).
Extended European Search Report issued in European Application No. 16888089.6 dated Jun. 26, 2019 (seven pages).
European Office Action issued in European Application No. 16 888 089.6 dated Jan. 27, 2020 (five pages).
European Office Action issued in European Application No. 16888089.6 dated Oct. 15, 2020 (10 pages).

* cited by examiner

IMAGE PROJECTION DEVICE

TECHNICAL FIELD

The present invention relates to an image projection device with which a user gives an input instruction by performing touch operation on an image projected on a projection screen.

BACKGROUND ART

Currently, various techniques for detecting touch operation when a user performs the touch operation on an image projected on a projection screen are proposed regarding a projector (see, for example, Patent document 1. Further, see Background Art described in Patent document 1.) In the technique disclosed in Patent document 1, a projected image on a projection screen is photographed with a camera provided in the vicinity of a projector, a difference between an original image of the projected image projected from the projector and the photographed image from the camera is evaluated, an area ratio between a region of shadow of the finger and a region of the finger in a touch region on the photographed image corresponding to a touch region on the projected image is obtained, and, when the area ratio becomes less than a predetermined value, it is determined that the hand has touched the touch region.

RELATED ART DOCUMENTS

Patent Documents

Patent document 1: Japanese Unexamined Patent Application Publication No. 2011-118533

DISCLOSURE OF THE INVENTION

Problems to be Solved by the Invention

By the way, touch operation includes various kinds of operation such as tap operation, double-tap operation, long-tap operation (long-tap), drag operation, flick operation and scroll operation. With the technique disclosed in the above-described Patent document 1, there is a problem that these various kinds of operation cannot be correctly determined. For example, the user touches an image twice with his/her finger so that the finger stays near the projection screen when the user performs double-tap operation. With the technique disclosed in the above-described Patent document 1, because it is determined that the hand has touched the touch region when the area ratio of the region of the shadow of the finger and the region of the finger becomes less than the predetermined value, it is difficult to clearly distinguish between a case where the finger has touched the image twice and a case where the finger constantly touches the image, concerning double-tap operation.

The present invention has been made in view of the above-described circumstances, and is directed to providing an image projection device which can correctly discern content of touch operation when a user performs various kinds of touch operation on an image projected on a projection screen.

Means of Solving the Problems

To achieve the above-described object, an image projection device according to the present invention includes a projection screen, a projection unit configured to project and display a predetermined image on the projection screen, an imaging unit having a function of focusing and configured to image the image projected on the projection screen to acquire image data, a reference data generating unit configured to generate reference data for specifying a position and a size of the image projected on the projection screen in an imaging range of the imaging unit on the basis of the image data obtained by the imaging unit, an image data extracting unit configured to extract image data in which a finger or a pointer with which a user performs operation on the image projected on the projection screen exists and in which the finger or the pointer is brought into focus, in the image data obtained by the imaging unit, a position data generating unit configured to generate position data for specifying a position of the finger or the pointer in an imaging range of the imaging unit on the basis of the image data extracted by the image data extracting unit, an operation determining unit configured to determine content of operation performed with the finger or the pointer on the basis of the image data extracted by the image data extracting unit, and an input control unit configured to recognize content of an input instruction corresponding to the operation performed with the finger or the pointer on the basis of the content of the operation determined by the operation determining unit, the position data generated by the position data generating unit, and the reference data generated by the reference data generating unit, and control the projection unit to project an image in accordance with the recognized content of the input instruction on the projection screen. Here, it is preferable that the imaging unit is adjusted to come into focus within a range of a predetermined distance in a front-back direction from the projection screen along a vertical direction of the projection screen.

In the image projection device of the present invention, the imaging unit has a function of focusing, and the image data extracting unit extracts image data in which the finger or the pointer with which the user performs operation on the image projected on the projection screen exists and in which the finger or the pointer is brought into focus, in the image data obtained by the imaging unit. Therefore, for example, by adjusting the imaging unit so as to come into focus within a range of a fixed short distance in a front-back direction from the projection screen along the vertical direction of the projection screen, because the image data extracted by the image data extracting unit includes only image data in which the finger or the pointer exists in the vicinity of the projection screen, the operation determining unit can correctly discern content of operation by determining the content of the operation performed with the finger or the pointer on the basis of the image data extracted by the image data extracting unit. The input control unit then recognizes content of the input instruction corresponding to the operation performed with the finger or the pointer on the basis of the content of the operation performed with the finger or the pointer obtained by being determined by the operation determining unit, the position data of the finger or the pointer generated by the position data generating unit and the reference data generated by the reference data generating unit, and controls the projection unit to project an image in accordance with the recognized content of the input instruction on the projection screen. Therefore, when the user performs various kinds of touch operation on the image projected on the projection screen, the image projection device of the present invention can correctly recognize the input instruction in accordance with the touch operation.

Further, in the image projection device according to the present invention, a frame may be pictured in each image projected on the projection screen or predetermined marks may be pictured at four corners of each image projected on the projection screen, and the reference data generating unit may recognize a position of the frame or the marks of the image in the imaging range of the imaging unit on the basis of the image data obtained by the imaging unit and set data relating to the recognized position of the frame or the marks as reference data. By the image having the frame or the marks being projected on the projection screen in this manner, the reference data generating unit can easily generate reference data relating to a position and a size of the image.

Further, in the image projection device according to the present invention, while the projection screen displays an image by projection light being irradiated from a back side of the projection screen, the projection unit may project the image from the back side of the projection screen, and the imaging unit may image the image from the back side of the projection screen to acquire image data. In this case, it is preferable that, when the user performs operation on the image from a surface side of the projection screen with a finger or a pointer, the image data extracting unit recognizes a shape, or a shape and color corresponding to the finger or the pointer in the image data captured through the projection screen and acquires image data in which the recognized shape or the recognized shape and color exists as image data in which the finger or the pointer with which the user performs operation on the image exists. Further, in the image projection device according to the present invention, the projection screen may display an image by projection light being irradiated from a surface side of the projection screen, in which case, the projection unit projects the image from the surface side of the projection screen, and the imaging unit images the image from the surface side of the projection screen to acquire image data.

Further, in the image projection device according to the present invention, in the case where a laser pointer which emits laser light is used as the pointer, when the user performs operation on the image projected on the projection screen by irradiating laser light from the laser pointer on the projection screen, the image data extracting unit may recognize a shape and/or color of the laser light from the laser pointer in the image data obtained by the imaging unit and acquire image data in which the recognized shape and/or color of the laser light exists as image data in which the finger or the pointer with which the user performs operation on the image exists. By this means, also in the case where the laser pointer is used as the pointer, the image projection device can correctly recognize the input instruction from the user.

Further, it is preferable that the image projection device according to the present invention includes a table on which a screen is placed for attaching the projection screen so that a distance between the projection screen and the projection unit and a distance between the projection screen and the imaging unit are respectively maintained at substantially fixed distances. As a result of such a table on which the screen is placed being used, the user can easily set positional relationship between the projection screen and the projection unit and positional relationship between the projection screen and the imaging unit.

Effects of the Invention

According to the image projection device according to the present invention, when a user performs various kinds of touch operation on an image projected on a projection screen, it is possible to correctly recognize an input instruction in accordance with the touch operation.

MODE FOR CARRYING OUT THE INVENTION

Figure 1:
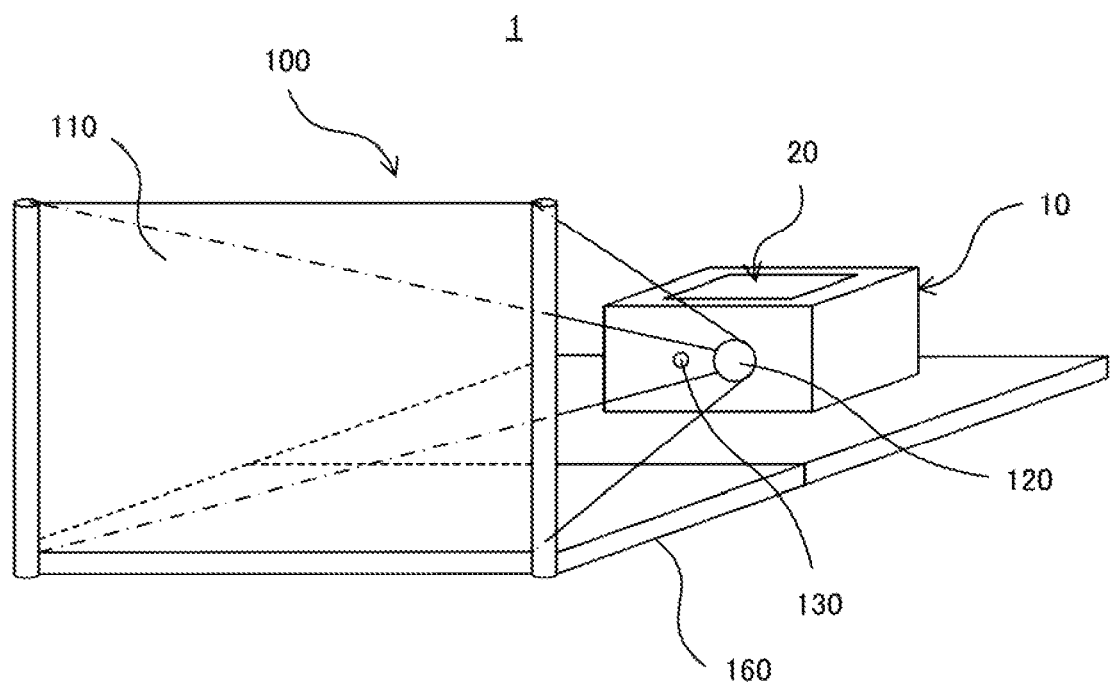
FIG. 1 is a schematic configuration diagram of a computer terminal including an image projection device which is an embodiment of the present invention.
Figure 2:
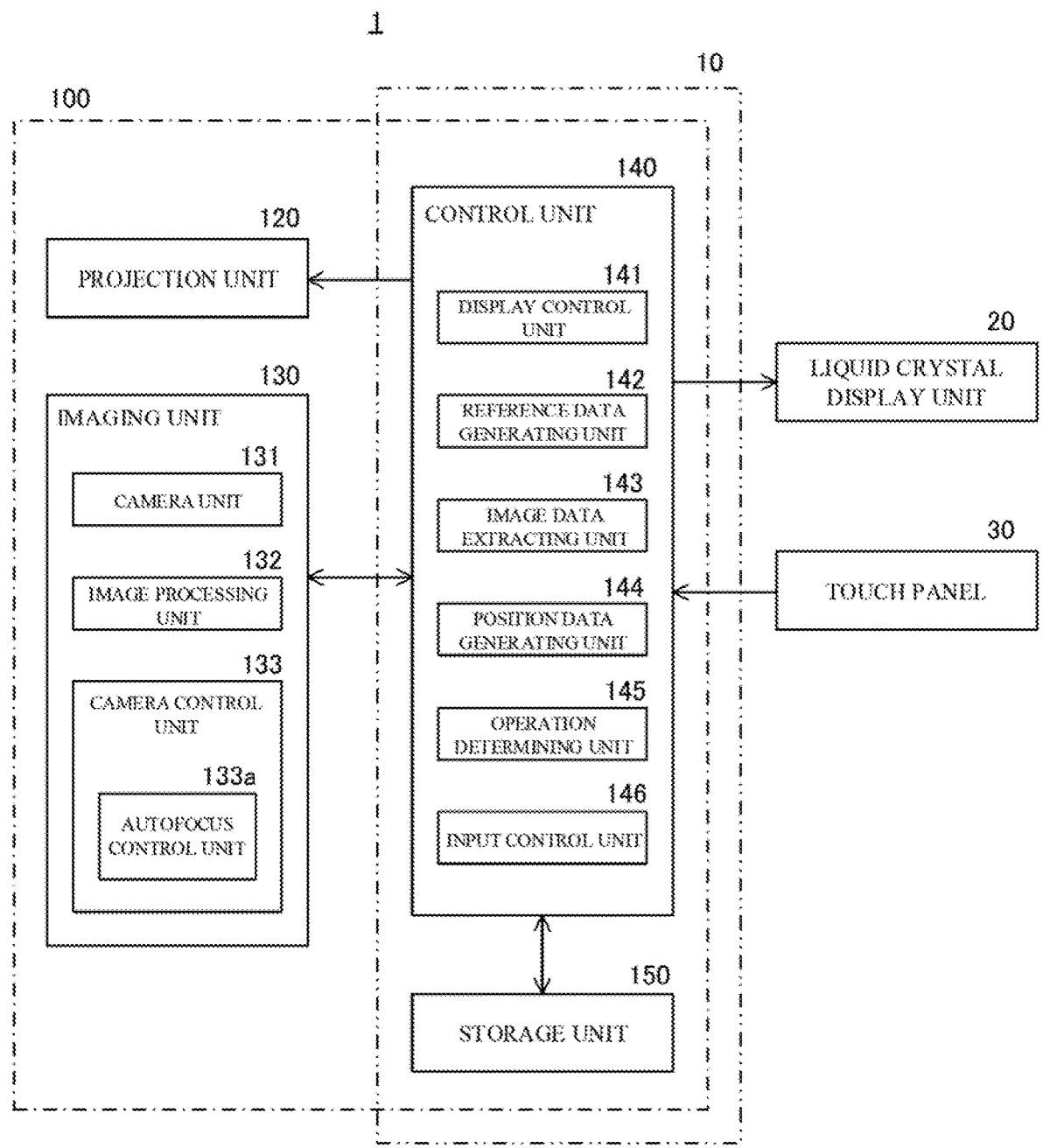
FIG. 2 is a schematic block diagram of the computer terminal including the image projection device of the present embodiment.

An embodiment for implementing the invention according to the present application will be described below with reference to the drawings. FIG. 1 is a schematic configuration diagram of a computer terminal including an image projection device which is an embodiment of the present invention, and FIG. 2 is a schematic block diagram of the computer terminal including the image projection device of the present embodiment.

The image projection device of the present invention recognizes content of an input instruction corresponding to touch operation when a user performs the touch operation on an image projected on a projection screen using a finger of the user or a pointer, and projects an image in accordance with the recognized content of the input instruction on the projection screen. Particularly, in the present embodiment, a case where this image projection device is incorporated into a computer terminal will be described. As illustrated in FIG. 1 and FIG. 2, the computer terminal 1 includes a computer body 10, a liquid crystal display unit 20, a touch panel 30 and the image projection device 100 of the present embodiment. The liquid crystal display unit 20 is provided on an upper face of a housing of the computer body 10. The touch panel 30 is provided on a screen of the liquid crystal display unit 20. At the touch panel 30, a position detecting unit (which is not illustrated) is provided which detects a position of contact when contact operation is performed on the screen of the liquid crystal display unit 20 and outputs contact position information indicating the detected position to the computer body 10. On the screen of the liquid crystal display unit 20, various kinds of screens such as a menu screen, an application screen and a character input screen are displayed. Note that a (touch panel) display other than a liquid crystal display may be used in place of the liquid crystal display unit 20.

The image projection device 100 of the present embodiment plays roles as a display apparatus and an input apparatus at the computer terminal 1. Here, as the image projection device 100, a rear-projection type image projection device which projects an image from a back side of a projection screen is used. As illustrated in FIG. 1 and FIG. 2, the image projection device 100 includes a projection screen 110, a projection unit 120, an imaging unit 130, a control unit 140, a storage unit 150, and a table 160 on which a screen is placed. The projection unit 120, the imaging unit 130, the control unit 140 and the storage unit 150 are provided inside a housing of the computer body 10. The control unit 140 which controls the image projection device 100, in the present embodiment, also controls the whole computer terminal 1. That is, the control unit 140 also plays a role as a control unit of the computer body 10. Note that a control unit which controls the image projection device 100 and a control unit of the computer body 10 may be separately provided.

Figure 3A:
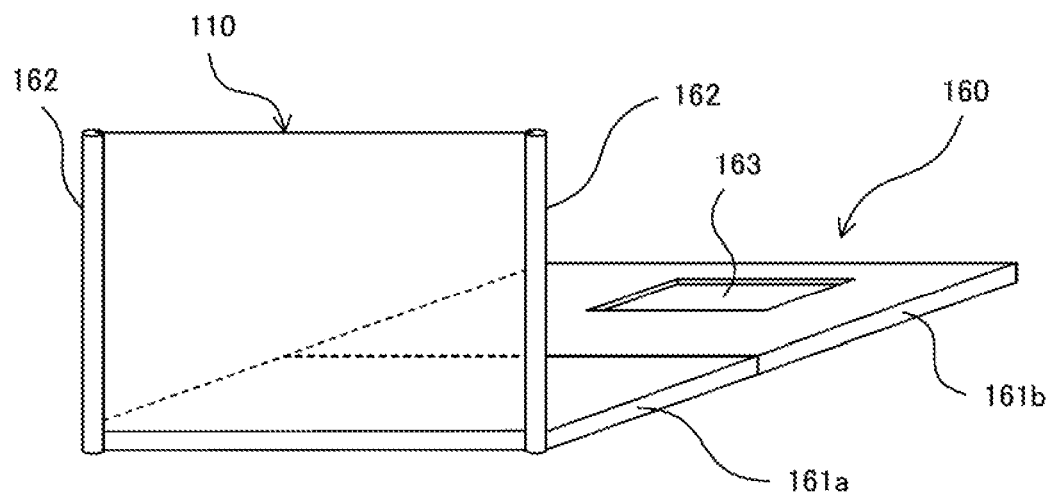
FIG. 3A is a schematic perspective view of a table on which a screen is placed.
Figure 3B:
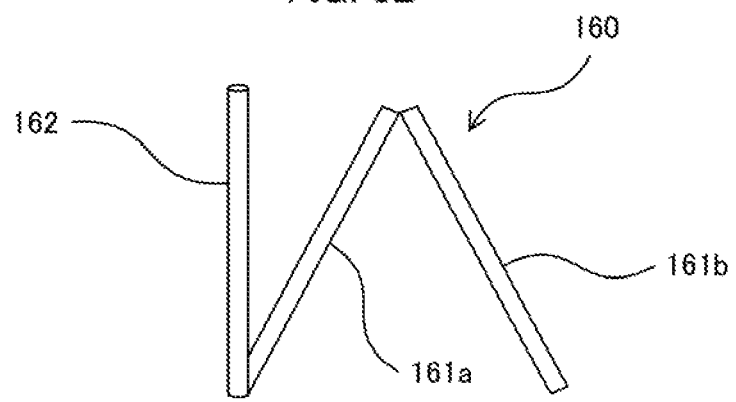
FIG. 3B is a schematic side view illustrating how the table on which the screen is placed is folded.
Figure 3C:
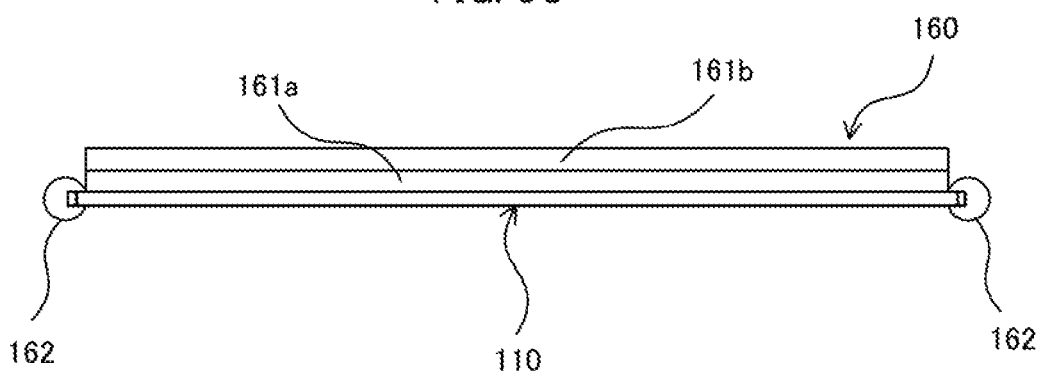
FIG. 3C is a schematic plan view of the table on which the screen is placed, which is in a folded state.

As the projection screen 110, a transmission type screen, that is, a rear-projection screen for displaying an image by projection light being irradiated from a back side of the screen is used. This projection screen 110 is a hard-type single sheet screen, and is fixed at the table 160 on which the screen is placed. In the present embodiment, as the table 160 on which the screen is placed, a folding table is used. FIG. 3A is a schematic perspective view of the table 160 on which the screen is placed, FIG. 3B is a schematic side view illustrating how the table 160 on which the screen is placed is folded, and FIG. 3C is a schematic plan view of the table 160 on which the screen is placed, which is in a folded state.

The table 160 on which the screen is placed is provided for placing the projection screen 110 and the computer body 10 so that the projection screen 110 and the computer body 10 are disposed with predetermined positional relationship. As illustrated in FIG. 3, the table 160 on which the screen is placed includes two base portions 161a, 161b and two pole portions 162, 162. Here, FIG. 3 illustrates the table 160 on which only the projection screen 110 is provided. Each of the base portions 161a and 161b is a plate-like member in a substantially rectangular shape, and the two base portions 161a and 161b are connected so as to be able to be folded. Further, at one base portion 161a, at an end portion on a side opposite to a side on which the other base portion 161b is connected, the two pole portions 162, 162 are attached. Each of the pole portions 162, 162 is a rod-like member, and grooves are formed along respective central axes of the pole portions 162, 162 on facing side surfaces. The projection screen 110 is attached to the table 160 on which the screen is placed by being inserted between the grooves of the two pole portions 162, 162. Further, at the other base portion 161b, as illustrated in FIG. 1, the computer body 10 is placed. In the present embodiment, as illustrated in FIG. 3A, a concave portion 163 is formed at a predetermined portion on a surface of the base portion 161b. This concave portion 163 is utilized as a mark indicating a location where the computer body 10 is provided. Therefore, the user can easily set positional relationship between the projection screen 110 and the computer body 10 so that a distance between the projection screen 110 and the projection unit 120 and a distance between the projection screen 110 and the imaging unit 130 respectively become substantially fixed distances only by attaching the projection screen 110 between the two pole portions 162, 162 and disposing the computer body 10 on the concave portion 163 of the base portion 161b. Further, it is possible to make the table 160 on which the screen is placed flat as illustrated in FIG. 3C by folding the two base portions 161a and 161b as illustrated in FIG. 3B.

Figure 4:
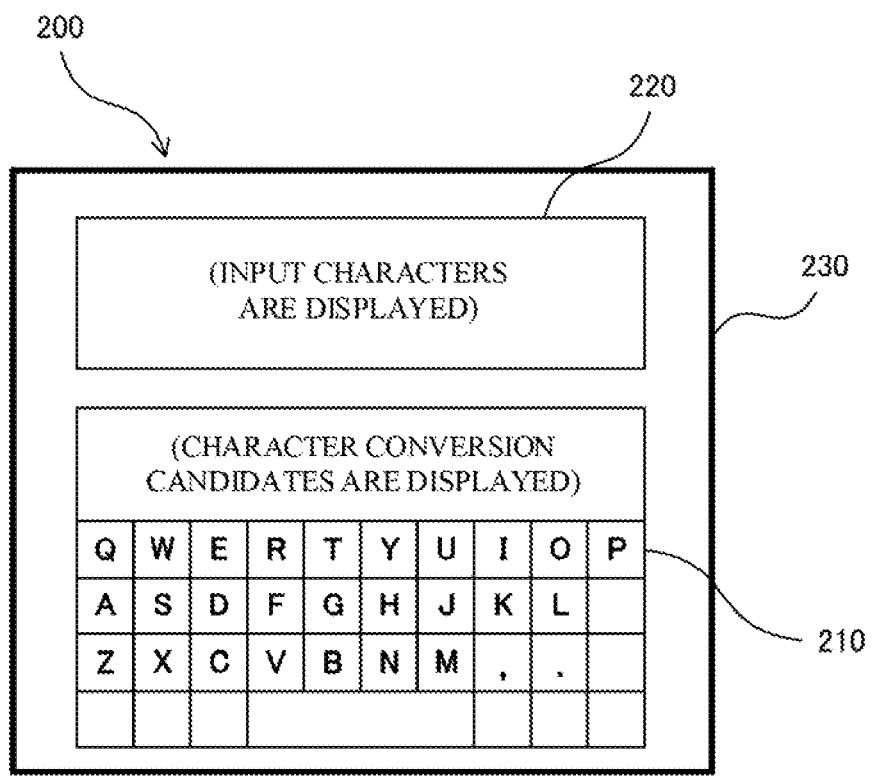
FIG. 4 is a diagram illustrating an example of an image of a character input screen.

The projection unit 120 projects and displays an image of a predetermined screen on the projection screen 110 from the back side of the projection screen 110. In the present embodiment, the projection screen 110 plays a role as a display apparatus of the computer terminal 1. Therefore, on the projection screen 110, images regarding various kinds of screens such as a menu screen and an operation screen on which various kinds of icons are displayed, and a character input screen for inputting characters are displayed. FIG. 4 is a diagram illustrating an example of an image of the character input screen. As illustrated in FIG. 4, the character input screen 200 has a keyboard image 210 and a display region 220 for displaying input characters, or the like. In the keyboard image 210, a plurality of character key images associated with respective characters (including symbols), and a plurality of function key images to which specific functions are provided, are provided. Further, in an image of each screen projected on the projection screen 110 by the projection unit 120, a frame is pictured. For example, the image of the character input screen 200 illustrated in FIG. 4 includes a rectangular outer frame 230 enclosing the keyboard image 210 and the display region 220.

In the present embodiment, the user can give various kinds of instructions to the control unit 140 by performing predetermined operation on the image of the screen projected on the projection screen 110 with a finger or a pointer. Here, as the pointer, for example, a pointing stick is used. Specifically, the user gives an instruction by performing predetermined operation while bringing the finger or the pointer into contact with the image of the screen projected on the projection screen 110 from the surface side of the projection screen 110 or performing predetermined operation in the vicinity of the image of the screen projected on the projection screen 110 from the surface side of the projection screen 110 without bringing the finger or the pointer into contact with the image. The control unit 140 then recognizes content of the instruction and controls the projection unit 120 to project the image of the screen in accordance with the recognized content of the instruction on the projection screen 110. Here, the operation performed on the image of the screen projected on the projection screen 110 includes various kinds of operation such as touch operation performed on a normal touch panel, that is, tap operation, double-tap operation, long-tap operation (long tap), drag operation, flick operation, scroll operation and the like. Note that each operation in the present embodiment described here refers to operation corresponding to touch operation performed on a normal touch panel regardless of whether or not operation is performed while the finger, or the like, is brought into contact with the image.

The imaging unit 130 which images an image projected on the projection screen 110 to acquire image data, as illustrated in FIG. 2, includes a camera unit 131, an image processing unit 132 and a camera control unit 133. The camera unit 131 has a lens and an image sensor. As illustrated in FIG. 1, the camera unit 131 images the projection screen 110 from the back side of the projection screen 110. A range (imaging range) which can be imaged by the camera unit 131 is the whole projection screen 110. Further, in the present embodiment, the camera unit 131 is directed to imaging the finger or the pointer with which the user performs operation on the image projected on the projection screen 110, through the transmission type projection screen 110. The image processing unit 132 performs processing of correcting color or gradation of the image of the image data captured by the camera unit 131 or performs image processing such as compression of the image data. The camera control unit 133 controls the image processing unit 132 or controls exchange of image data with the control unit 140. Note that, in the present embodiment, a case will be described where the image processing unit 132 is provided at the imaging unit 130, but the image processing unit 132 may be provided at the control unit 140 instead of being provided at the imaging unit 130.

Further, in the present embodiment, the imaging unit 130 has a function of focusing. Therefore, the camera control unit 133 includes an autofocus control unit 133a. The autofocus control unit 133a adjusts (controls) the camera unit 131 so as to bring the projection screen 110 into focus. Specifically, in the present embodiment, because a distance between the projection screen 110 and the camera unit 131 is set in advance at a substantially fixed value, the autofocus control unit 133a performs focusing processing so that a position away from the camera unit 131 by the above-described predetermined distance is brought into focus when imaging operation is started. Further, at this time, the autofocus control unit 133a adjusts the camera unit 131 so as to come into focus within a range of a predetermined distance in a front-back direction from the projection screen 110 along a vertical direction of the projection screen 110. The range (depth of field) in which the camera unit 131 comes into focus is limited to a narrow range. For example, in the present embodiment, a case will be considered where the autofocus control unit 133a adjusts the camera unit 131 so as to come into focus within a range of 10 mm in a front-back direction from the projection screen 110 along the vertical direction of the projection screen 110. Therefore, while the imaging unit 130 performs imaging in a state where a subject (the finger or the pointer) is brought into focus if the subject with which operation is performed on the image of the screen projected on the projection screen 110 is located in the vicinity of the projection screen 110, the imaging unit 130 cannot perform imaging in a state where the subject is brought into focus if the subject is located farther from the projection screen 110 than the depth of field. Note that, as an autofocus system, one of an active autofocus system in which a subject is irradiated with infrared light, ultrasound, or the like and a distance is detected from time required for the reflected wave to return and an irradiation angle, and a passive autofocus system such as a phase difference detection system or a contrast detection system in which a distance is measured by utilizing an image captured with a lens of the camera unit 131, may be used.

The image data obtained through imaging by the imaging unit 130 is transmitted to the control unit 140 and stored in the storage unit 150 by the control unit 140. Further, the imaging unit 130 has a function of capturing a still image and a function of capturing a moving image, and the control unit 140 can acquire still image data or moving image data, if necessary, as the image data.

The control unit 140 controls the whole image projection device 100. For example, the control unit 140 controls the projection unit 120 to project the screen on the projection screen 110 or controls imaging by the imaging unit 130. Specifically, as illustrated in FIG. 2, the control unit 140 includes a display control unit 141, a reference data generating unit 142, an image data extracting unit 143, a position data generating unit 144, an operation determining unit 145 and an input control unit 146.

The display control unit 141 controls the liquid crystal display unit 20 and the projection unit 120. Specifically, when the user performs touch operation at the liquid crystal display unit 20, the display control unit 141 recognizes content of an instruction by the touch operation on the basis of contact position information transmitted from the touch panel 30. At this time, if the recognized content of the instruction is an instruction for displaying a predetermined screen at the liquid crystal display unit 20, the display control unit 141 controls the liquid crystal display unit 20 to display the screen at the liquid crystal display unit 20. Further, if the recognized content of the instruction is an instruction for displaying an image of a predetermined screen on the projection screen 110, the display control unit 141 controls the projection unit 120 to display the image of the screen on the projection screen 110. Further, when the projection unit 120 starts processing of projecting an image, the display control unit 141 performs processing of adjusting the image so that the image is clearly displayed on the projection screen 110. When an image is displayed on the projection screen 110, the display control unit 141 may control the liquid crystal display unit 20 so that the same image as the image displayed on the projection screen 110 is displayed at the liquid crystal display unit 20.

The reference data generating unit 142 generates reference data relating to the image projected on the projection screen 110 on the basis of the image data obtained by the imaging unit 130. This reference data is data for specifying a position and a size of the image in the imaging range. For example, in the case where the image of the screen illustrated in FIG. 4 is projected on the projection screen 110, position data at four corners of the outer frame 230 of the screen can be used as the reference data. Specifically, in the present embodiment, an XY coordinate system in which a horizontal direction is an X axis direction and a vertical direction is a Y axis direction is set within the imaging range of the imaging unit 130. The reference data generating unit 142 recognizes a position of the outer frame 230 of the screen on the basis of the image data obtained by the imaging unit 130 and acquires data relating to the recognized position of the outer frame 230, that is, XY coordinates of the four corners of the outer frame 230 in the XY coordinate system, as the reference data. The reference data generated at the reference data generating unit 142 is stored in the storage unit 150. In this manner, in the present embodiment, by the image having the outer frame being projected on the projection screen 110, the reference data generating unit 142 can easily generate reference data relating to the position and the size of the image.

The image data extracting unit 143 extracts image data in which the finger or the pointer with which the user performs operation on the image projected on the projection screen 110 exists and in which the finger or the pointer is brought into focus in the image data obtained by the imaging unit 130. Here, whether or not the finger or the pointer exists is judged using a typical image recognition method. Therefore, the image data extracted by the image data extracting unit 143 includes, only image data in which the finger or the pointer is located in the vicinity of the projection screen 110. The image data extracted in this manner is stored in the storage unit 150. Further, the image data extracting unit 143 generates data relating to time (time data) at which the image data is captured for each piece of extracted image data and stores the generated time data in the storage unit 150 in association with the image data. At the operation determining unit 145 and the position data generating unit 144, processing is performed on the basis of the image data extracted by the image data extracting unit 143.

Figure 5:
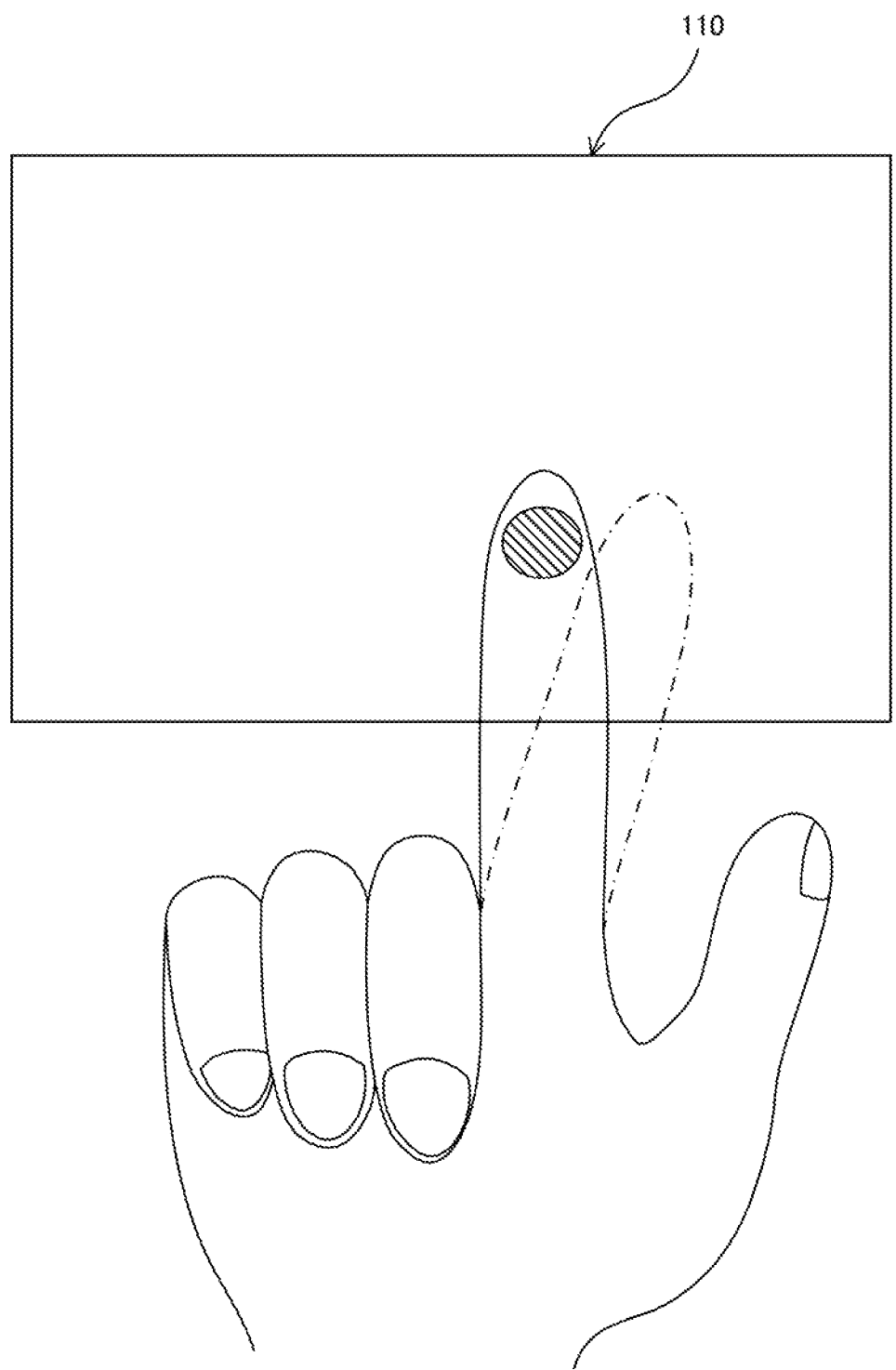
FIG. 5 is a diagram schematically illustrating a portion of a finger whose shape or color is changed when a user brings the finger into contact with a projection screen.

Specifically, in the present embodiment, when the user performs operation on the image from the surface side of the projection screen 110 with the finger or the pointer, the image data extracting unit 143 can recognize a shape, or a shape and color corresponding to the finger or the pointer in the image data captured through the projection screen 110 and acquire image data in which the recognized shape or the recognized shape and color exists as the image data in which the finger or the pointer with which the user performs operation on the image exists. Further, when the finger or the pointer contacts the projection screen 110, in the case where the shape or color of the finger or the pointer changes on the projection screen 110, the image data extracting unit 143 may recognize the changed shape or color and judge existence of the finger or the pointer. That is, when the user performs operation on the image while bringing the finger or the pointer into contact with the image from the surface side of the projection screen 110, the image data extracting unit 143 may recognize change of the shape, change of color, or change of the shape and color of the finger or the pointer when the user brings the finger or the pointer into contact with the image in the image data captured through the projection screen 110 and acquire image data in which the recognized change of the shape, the recognized change of color, or the recognized change of the shape and color of the finger or the pointer exists as the image data in which the finger or the pointer with which the user performs operation on the image exists. In this case, for example, as the pointer, one whose tip is formed with a soft material and whose tip easily deforms when contacts the projection screen 110, can be used. Further, as an example, FIG. 5 schematically illustrates a portion of the finger whose shape or color changes when the user brings the finger into contact with the projection screen 110. In the case where the shape or color of the finger changes by the finger being brought into contact with the projection screen 110, the image data extracting unit 143 can judge that the finger exists by recognizing the changed shape or color of the portion of the finger.

Note that it is preferable that a figure such as a shape of a star or a cross shape is pictured or a sticker, or the like, on which such a figure is pictured is put at a tip portion of the finger (for example, a finger pad) or the pointer used by the user for operation. Further, it is also possible to form a tip portion of the pointer in a shape of the above-described figure. In this case, the image data extracting unit 143 judges whether or not the figure exists in the image data and judges that the finger or the pointer exists if the figure exists. Because recognition of the above-described figure is easier than recognition of the finger, or the like, itself, it is possible to easily and quickly perform processing for judging existence of the finger, or the like.

By the way, as the rear-projection screen, there is a translucent projection screen, an opalescent projection screen, or the like, as well as a transparent projection screen. In the case where a translucent projection screen, an opalescent projection screen, or the like, is used, it is difficult to judge whether or not the finger or the pointer is brought into focus. To address this problem, for example, the following method can be used. That is, in the case where various kinds of projection screens such as a translucent projection screen and an opalescent projection screen are used, at least one image in which the finger or the pointer contacts the projection screen is acquired in advance, and the image is preset as an image for which it should be judged that the finger or the pointer is brought into focus. The image data extracting unit 143 can correctly judge whether or not the finger or the pointer is brought into focus by comparing image data which is actually captured with the preset image.

Further, the image data extracting unit 143 may perform processing of excluding data concerning an image which is currently projected on the projection screen 110 on the image data obtained by the imaging unit 130 and judge whether the finger or the pointer exists on the basis of the image data subjected to the processing. By this means, it is possible to perform processing of judging existence of the finger, or the like, more easily and quickly.

The position data generating unit 144 generates position data for specifying a position of the finger or the pointer in the imaging range of the imaging unit 130 on the basis of the image data extracted by the image data extracting unit 143. Specifically, the position data generating unit 144 acquires an XY coordinate of a position where the finger or the pointer exists (for example, a center position of the tip of the finger or a center position of the tip portion of the pointer) in the XY coordinate system set within the imaging range as position data. The acquired position data is stored in the storage unit 150 in association with the image data.

The operation determining unit 145 determines content of operation performed with the finger or the pointer on the basis of the image data extracted by the image data extracting unit 143. Here, as described above, the image data extracted by the image data extracting unit 143 includes only image data in which the finger or the pointer exists in the vicinity of the projection screen 110. Specifically, the operation determining unit 145 determines content of operation by examining movement of the finger or the pointer on the basis of the position data and the time data associated with each piece of image data for a series of pieces of image data obtained in chronological order.

For example, in the case where image data in which the position of the finger or the pointer remains virtually unchanged is extracted only for a certain short period, the operation determining unit 145 determines that tap operation is performed with the finger or the pointer. Further, in the case where, after image data in which the position of the finger or the pointer remains virtually unchanged is extracted for a certain short period, image data in which the finger or the pointer exists at substantially the same position is extracted for a certain short period again before a certain period of time has elapsed, it is determined that double-tap operation is performed with the finger or the pointer. Still further, in the case where image data in which the position of the finger or the pointer remains virtually unchanged is extracted for equal to or longer than a certain period of time, it is determined that long-tap operation is performed with the finger or the pointer. Further, in the case where image data in which the position of the finger or the pointer remains virtually unchanged is extracted for a short period, and, subsequently, image data in which the position of the finger or the pointer sequentially changes is extracted, it is determined that drag operation is performed with the finger or the pointer. In this manner, the operation determining unit 145 can correctly recognize content of the operation performed with the finger or the pointer as operation among various kinds of operation such as tap operation, double-tap operation, long-tap operation and drag operation by determining content of the operation performed with the finger or the pointer on the basis of the image data extracted by the image data extracting unit 143. Data relating to the recognized content of the operation performed with the finger or the pointer is stored in the storage unit 150.

Further, in the present embodiment, because the imaging unit 130 is adjusted so as to come into focus within a range of 10 mm in a front-back direction from the projection screen 110 along the vertical direction of the projection screen 110, the user can perform operation such as tap operation only by putting the finger or the pointer at a position in a distance of approximately 10 mm from the projection screen 110 without actually bringing the finger or the pointer into contact with the projection screen 110. Because the image data extracting unit 143 extracts only image data in which the finger or the pointer exists within a range of approximately 10 mm from the projection screen 110, the operation determining unit 145 can correctly discern content of the operation by determining the content of the operation performed with the finger or the pointer on the basis of the image data extracted by the image data extracting unit 143. Note that, as described above, in the case where the shape or color of the finger or the pointer changes on the projection screen 110 if the finger or the pointer contacts the projection screen 110, the image data extracting unit 143 can recognize change of the shape or color upon contact and extract image data in which the recognized change of the shape or color exists. In this case, because the user performs operation while bringing the finger or the pointer into contact with the projection screen 110, the user can perform operation as if the user operated an existing touch panel, and the operation determining unit 145 can correctly discern content of the operation by determining the content of the operation performed with the finger or the pointer on the basis of the image data extracted by the image data extracting unit 143.

The input control unit 146 recognizes content of an input instruction corresponding to the operation performed with the finger or the pointer on the basis of the data relating to the content of the operation determined by the operation determining unit 145, the position data generated by the position data generating unit 144 and the reference data generated by the reference data generating unit 142, and controls the projection unit 120 to project an image in accordance with the recognized content of the input instruction on the projection screen 110.

For example, in the case where the image projected on the projection screen 110 is an image of a menu screen, the input control unit 146 can recognize a range in which the menu screen exists in the imaging range of the imaging unit 130 on the basis of the reference data relating to the image of the screen. Further, because the input control unit 146 knows a configuration of the menu screen in advance, the input control unit 146 can recognize a position and a range of each icon in the menu screen. Therefore, for example, in the case where the user performs double-tap operation of an icon on the menu screen with the finger, the input control unit 146 can specify an icon which is an operation target by examining a region of which icon in the menu screen, the position of the finger obtained from the position data of the finger corresponds to, and can specify that the operation is double-tap operation by examining content of the operation. As a result, the input control unit 146 recognizes that an input instruction corresponding to the operation of this time is an input instruction for displaying an image of a screen relating to the operated icon and performs processing of displaying the image of the screen relating to the icon on the projection screen 110.

Further, in the case where the image projected on the projection screen 110 is an image of the character input screen 200 illustrated in FIG. 4, the input control unit 146 can recognize a range in which the character input screen 200 exists in the imaging range of the imaging unit 130 on the basis of reference data relating to the image of the screen. Further, because the input control unit 146 knows a configuration of the character input screen 200 in advance, the input control unit 146 can recognize a range of the keyboard image 210, a region of each character key image, or the like, in the character input screen 200. Therefore, for example, in the case where the user performs tap operation of a character key image on the keyboard image 210 with the finger, the input control unit 146 can specify the operated character key by examining a region of which character key image in the keyboard image 210, the position of the finger obtained from the position data of the finger corresponds to, and can specify that the operation is tap operation by examining content of the operation. As a result, the input control unit 146 recognizes that an input instruction corresponding to the operation of this time is an input instruction of a key corresponding to the above-described operated character key and performs processing of displaying an image of a character for which an input instruction is given in the display region 220.

Figure 6:
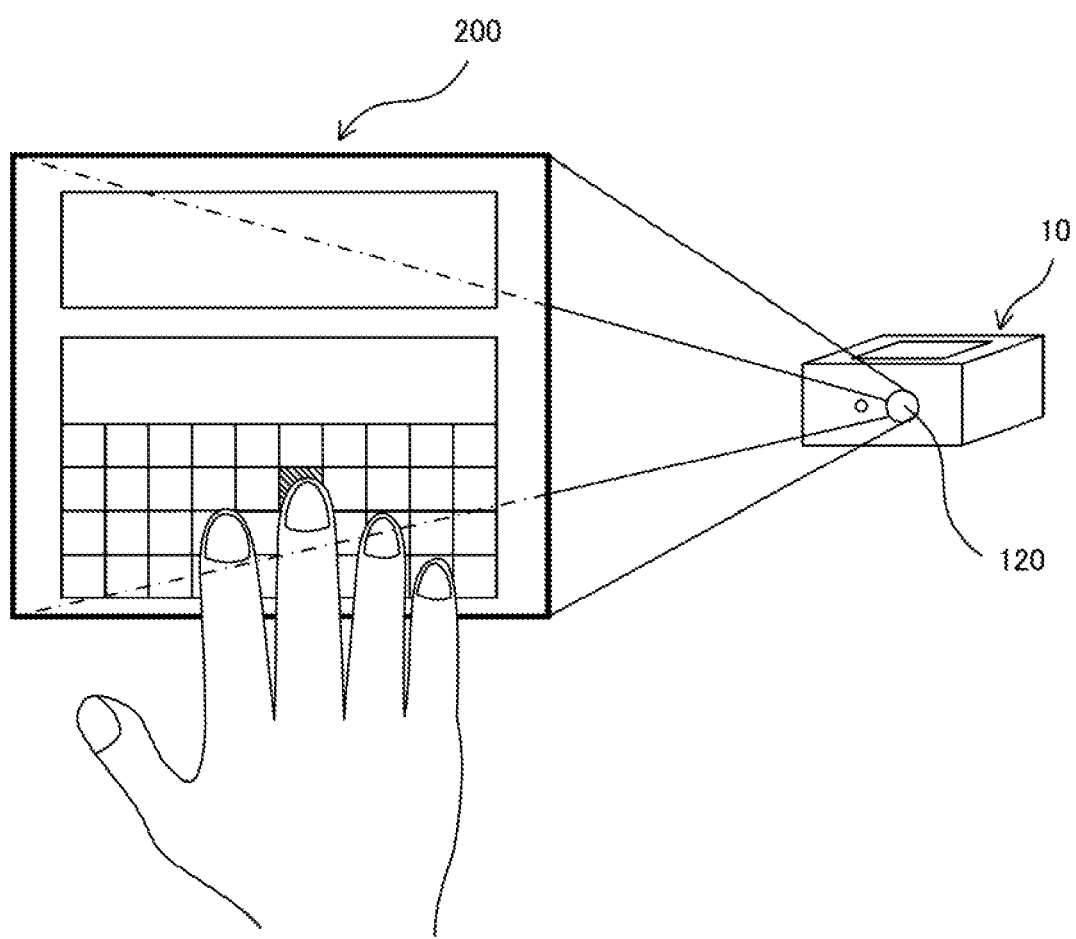
FIG. 6 is a diagram illustrating an example of an image of the character input screen in which, when the user performs tap operation on a character key image, the character key image is highlighted.

Note that, in the case where the user performs tap operation of a character key image and it is recognized that there is an input instruction of a character corresponding to the operated character key, the input control unit 146 may perform processing of displaying an image of a screen in which only the operated character key image is highlighted in the character input screen 200 on the projection screen 110. By this means, the user can easily confirm the character key operated by the user. FIG. 6 illustrates an example of an image of the character input screen 200 in which, when the user performs tap operation on a character key image, the character key image is highlighted.

In the storage unit 150, various kinds of programs, data, or the like, are stored. The programs stored in the storage unit 150 include, for example, a screen display processing program for performing processing of screen display such as switching of a screen when operation of selecting an icon is performed in the menu screen, a character input processing program for performing processing of character input when operation of selecting a character key is performed in the character input screen 200, and the like. Further, the data stored in the storage unit 150 includes, for example, image data for various kinds of screens. Still further, the storage unit 150 is also used as a working memory.

Figure 7:
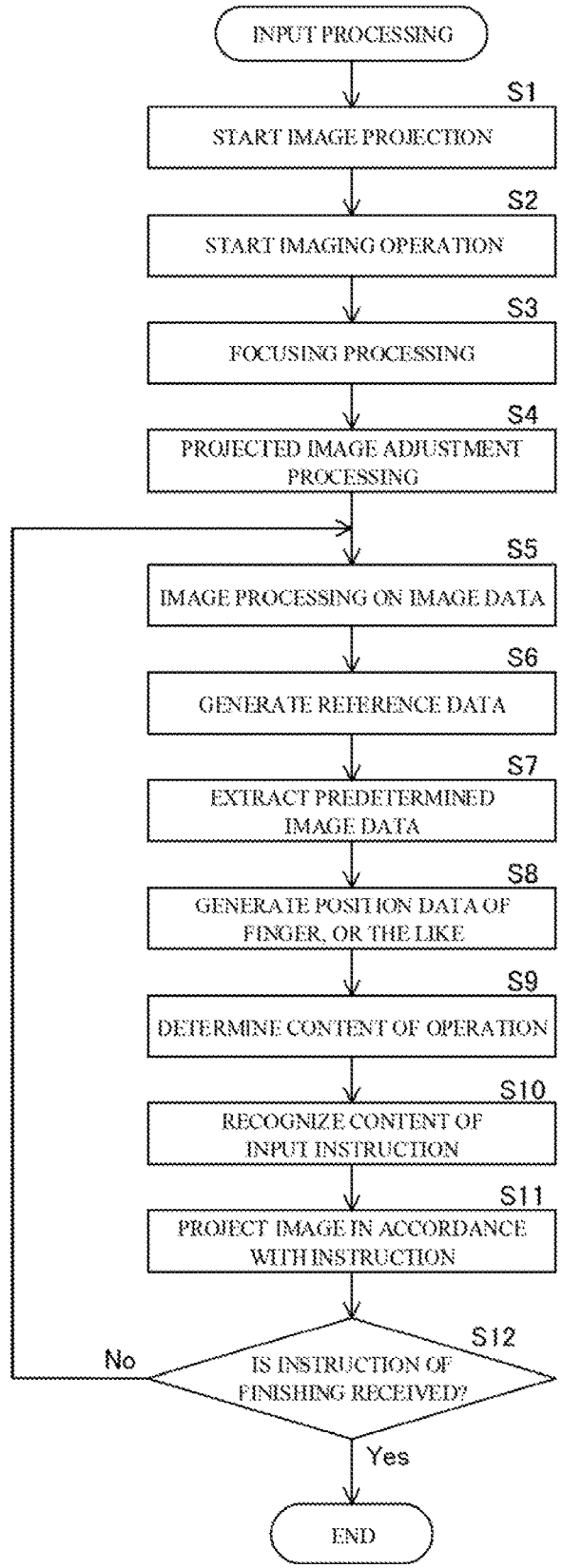
FIG. 7 is a flowchart for explaining procedure of input processing in the image projection device according to the present embodiment.

Input processing in the image projection device 100 of the present embodiment will be described next. FIG. 7 is a flowchart for explaining procedure of input processing in the image projection device 100 of the present embodiment.

The user, for example, operates the touch panel 30 to give an instruction of displaying an image of a predetermined screen on the projection screen 110. When the control unit 140 (display control unit 141) receives this instruction, the control unit 140 controls the projection unit 120 so as to display the image of the screen on the projection screen 110 (S1). When projection of the image is started in this manner, the control unit 140 starts imaging operation by the imaging unit 130 (S2).

The control unit 140 then causes the camera control unit 133 to execute focusing processing (S3). Specifically, in the present embodiment, because a distance between the projection screen 110 and the camera unit 131 is set in advance at a substantially fixed value, the autofocus control unit 133a of the camera control unit 133 controls the camera unit 131 so that a position away from the camera unit 131 by the distance determined in advance is brought into focus. Further, the focusing processing can be performed using other methods. For example, by infrared reflection coating being applied on the projection screen 110 itself, by a frame being provided at the projection screen 110 or by reflecting portions being provided at four corners of the projection screen 110, the camera control unit 133 can detect a distance to the projection screen 110 with an autofocus function and control the camera unit 131 so that a position away from the camera unit 131 by the detected distance is brought into focus. Note that it is also possible to provide reflecting portions on the table 160 on which the screen is placed instead of providing the reflecting portions at the projection screen 110.

Further, at this time, the display control unit 141 controls the projection unit 120 to perform projected image adjustment processing so that the image is clearly displayed on the projection screen 110 (S4). Specifically, in the projected image adjustment processing, the display control unit 141 judges whether or not an image which is currently displayed clearly appears on the image data captured by the imaging unit 130 on the basis of the image data. Then, if the image which is currently displayed clearly appears, it is recognized that the image is clearly displayed on the projection screen 110. Further, the display control unit 141 can recognize positional relationship between the projection unit 120 and the projection screen 110 on the basis of distance information to the projection screen 110 obtained by utilizing the autofocus function of the imaging unit 130 and the image data of the projection screen 110 captured by the imaging unit 130, and control the projection unit 120 to project the image on the projection screen 110 at a size, a shape, an angle, or the like, in accordance with the recognized positional relationship.

If the image is clearly displayed on the projection screen 110 in this manner, the user performs predetermined operation on the image of the screen projected on the projection screen 110 with the finger or the pointer from the surface side of the projection screen 110 so as to give an input instruction to the computer body 10. How the user performs the operation is imaged with the imaging unit 130 through the projection screen 110, and the obtained image data is transmitted to the image processing unit 132. The image processing unit 132 then performs predetermined image processing on the image data (S5) and transmits the image data subjected to the image processing to the control unit 140.

The reference data generating unit 142 then generates reference data relating to the image of the screen projected on the projection screen 110 on the basis of the image data obtained by the imaging unit 130 (S6). Specifically, the reference data generating unit 142 acquires position data (XY coordinates) of the four corners of the outer frame 230 of the screen as illustrated in FIG. 4 and sets the acquired position data of the four corners of the outer frame 230 as the reference data. This reference data is temporarily stored in the storage unit 150.

The image data extracting unit 143 then extracts image data in which the finger or the pointer with which the user performs operation on the image of the screen projected on the projection screen 110 exists and in which the finger or the pointer is brought into focus in the image data obtained by the imaging unit 130 (S7). By this means, only image data in which the finger or the pointer exists in the vicinity of the projection screen 110 is acquired. The image data extracted in this manner is temporarily stored in the storage unit 150. Further, the image data extracting unit 143 generates time data relating to time at which the image data is captured for the extracted image data and stores the generated time data in the storage unit 150 in association with the image data.

The position data generating unit 144 then generates position data (XY coordinates) for specifying a position of the finger or the pointer (for example, a center position of a tip of the finger or a center position of a tip portion of the pointer) on the basis of the image data extracted by the image data extracting unit 143 (S8). The generated position data is temporarily stored in the storage unit 150 in association with the image data.

Thereafter, the operation determining unit 145 determines content of the operation performed with the finger or the pointer on the basis of the image data extracted by the image data extracting unit 143 (S9). For example, the operation determining unit 145 determines content of the operation by utilizing the position data and the time data associated with each piece of image data for a plurality of pieces of image data extracted by the image data extracting unit 143. Data relating to the recognized content of the operation performed with the finger or the pointer is temporarily stored in the storage unit 150.

The input control unit 146 then recognizes content of an input instruction corresponding to the operation performed with the finger or the pointer on the basis of the data relating to the content of the operation determined by the operation determining unit 145, the position data generated by the position data generating unit 144, and the reference data generated by the reference data generating unit 142 (S10), and controls the projection unit 120 so as to project an image of a screen in accordance with the recognized content of the input instruction on the projection screen 110 (S11).

For example, in the case where the user performs double-tap operation of an icon on the menu screen with the finger, because the input control unit 146 can specify an icon which is an operation target on the basis of position data of the finger, and can specify the operation on the basis of data relating to content of the operation, the input control unit 146 can recognize that the input instruction corresponding to the operation of this time is an input instruction of displaying a screen relating to the above-described operated icon. Further, in the case where the user performs tap operation of a character key image on the keyboard image 210 with the finger, because the input control unit 146 can specify the operated character key on the basis of position data of the finger and can specify the operation on the basis of data relating to content of the operation, the input control unit 146 can recognize that the input instruction corresponding to the operation of this time is an input instruction of a character corresponding to the above-described operated character key.

After processing in step S11, the control unit 140 judges whether or not an instruction for finishing image projection is received from the user (S12). If an instruction for finishing image projection is received, the input processing illustrated in FIG. 5 is finished. Meanwhile, if an instruction for finishing image projection is not received, the processing shifts to step S5, and the input processing is continued. Note that the user can give an instruction for finishing image projection, for example, through touch operation on the touch pad 30 or the projection screen 110.

In the image projection device of the present embodiment, the imaging unit has a function of focusing, and the image data extracting unit extracts image data in which the finger or the pointer with which the user performs operation on the image projected on the projection screen exists and in which the finger or the pointer is brought into focus in the image data obtained by the imaging unit. Therefore, for example, by the imaging unit being adjusted so as to come into focus within a range of 10 mm in a front-back direction from the projection screen along the vertical direction of the projection screen, because the image data extracted by the image data extracting unit includes only image data in which the finger or the pointer exists in the vicinity of the projection screen, the operation determining unit can correctly discern content of operation by determining the content of the operation performed with the finger or the pointer on the basis of the image data extracted by the image data extracting unit. The input control unit then recognizes content of an input instruction corresponding to the operation performed with the finger or the pointer on the basis of data relating to the content of the operation performed with the finger or the pointer obtained by being determined by the operation determining unit, the position data of the finger or the pointer generated by the position data generating unit and the reference data generated by the reference data generating unit, and controls the projection unit to project an image in accordance with the recognized content of the input instruction on the projection screen. Therefore, when the user performs various kinds of touch operation on the image projected on the projection screen, the image projection device of the present embodiment can correctly recognize an input instruction in accordance with the touch operation.

Note that the present invention is not limited to the above-described embodiment, and various modifications can be made within the scope of the gist.

Figure 8:
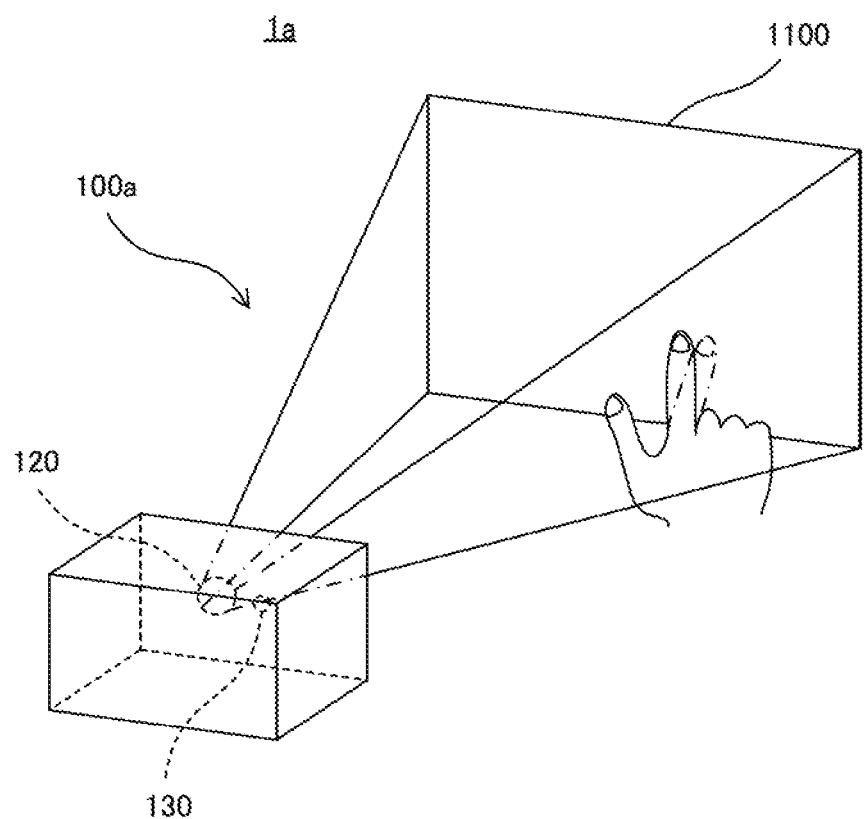
FIG. 8 is a schematic configuration diagram of a computer terminal including a front-projection type image projection device which is a modified example of the present invention.

For example, while, in the above-described embodiment, a case has been described where a rear-projection type image projection device which projects an image from the back side of the projection screen is used as the image projection device of the present invention, it is also possible to use a front-projection type image projection device which projects an image from the surface side of the projection screen. FIG. 8 illustrates a schematic configuration diagram of a computer terminal 1a including a front-projection type image projection device 100a which is a modified example of the present invention. The front-projection type image projection device 100a also includes a projection screen 1100, a projection unit 120, an imaging unit 130, a control unit (not illustrated), a storage unit (not illustrated) and a table on which a screen is placed (not illustrated) as illustrated in FIG. 8 as with the image projection device 100 of the above-described embodiment. Here, as the projection screen 1100, a front-projection screen for displaying an image by projection light being irradiated from a surface side of the projection screen is used. Specifically, the front-projection screen is mainly divided into three types of a diffusion type screen, a reflection type screen and a regression type screen. The diffusion type screen has characteristics that incident light is diffusely reflected in all directions and has a feature of a very large viewing angle. The reflection type screen has characteristics that incident light is reflected at a reflection angle which is the same angle as an incident angle, and the regression type screen has characteristics that reflected light returns in the same direction as an incident direction of incident light. The projection unit 120 projects an image from the surface side of the projection screen 1100, and the imaging unit 130 images the image from the surface side of the projection screen 1100 to acquire image data. Further, the control unit in the image projection device 100a in this modified example includes a display control unit, a reference data generating unit, an image data extracting unit, an operation determining unit, a position data generating unit and an input control unit as with the control unit in the image projection device 100 of the above-described embodiment. These units are similar to those in the image projection device 100 of the above-described embodiment except that the projection unit 120, the imaging unit 130 and the table on which the screen is placed are disposed on the surface side of the projection screen 1100.

In the front-projection type image projection device 100a, when the user performs operation on the image projected on the projection screen 1100 from the surface side of the projection screen 1100 with the finger or the pointer, how the user performs the operation is imaged by the imaging unit 130 from the surface side of the projection screen 1100. Here, the imaging unit 130 is adjusted so as to come into focus within a range of 15 mm in a front-back direction from the projection screen 1100 along the vertical direction of the projection screen 1100. The input control unit then recognizes content of an input instruction corresponding to the operation performed with the finger or the pointer on the basis of data relating to the operation performed with the finger or the pointer obtained by being determined by the operation determining unit, the position data of the finger or the pointer generated by the position data generating unit and the reference data for the screen stored in the storage unit, and controls the projection unit 120 so as to project an image in accordance with the recognized content of the input instruction on the projection screen 1100. Note that, while the image data obtained by the imaging unit 130 also includes image data in which a portion of the image projected on the projection screen 1100 is hidden by the finger of the pointer, the operation determining unit can recognize operation performed with the finger or the pointer by superimposing an image which is currently projected on the projection screen 1100 on the image data in which the portion of the image is hidden.

Further, while, in the above-described embodiment and the modified example illustrated in FIG. 8, a case has been described where the image projection device includes one projection unit, the image projection device may include a plurality of projection units. In this case, it is possible to project one screen on the projection screen in a divided manner using the plurality of projection units.

Further, in the above-described embodiment and the modified example illustrated in FIG. 8, the projection unit may project an image in which blue light, or the like, is reduced by reducing an amount of light in the blue or violet region, on the projection screen. By this means, it is possible to display an image which is gentle to the eyes of the user.

Further, while, in the above-described embodiment and the modified example illustrated in FIG. 8, a case has been described where the image projection device includes one imaging unit, the image projection device may include a plurality of imaging units.

In addition, while, in the above-described embodiment and the modified example illustrated in FIG. 8, a case has been described where the projection screen is a hard-type single sheet screen, the projection screen may be a folding screen, a roll-up screen, or the like.

Further, in the above-described embodiment and the modified example illustrated in FIG. 8, a laser pointer which emits laser light may be used as the pointer. In this case, it is necessary to set content of operation performed with the laser pointer in advance. For example, it is set such that operation of lighting twice with laser light means double-tap operation, operation of moving at equal to or lower than predetermined speed while lighting with laser light means scroll operation, operation of moving at equal to or higher than predetermined speed while lighting with laser light means flick operation, and operation of moving after lighting a predetermined number of times with laser light means drag operation. Specifically, the image data extracting unit recognizes a shape and/or color of laser light from the laser pointer in the image data obtained by the imaging unit when the user performs operation on the image projected on the projection screen by irradiating laser light from the laser pointer on the projection screen, and acquires image data in which the recognized shape and/or color of the laser light exists as image data in which the finger or the pointer with which the user performs operation on the image exists. Here, concerning recognition of color of the laser light, for example, a frequency of color of the laser light is preset, and in the case where the image data extracting unit recognizes the preset color, it may be regarded that the laser light exists. While there can be a case where color similar to the preset color exists in the image, by using color of a frequency in red region which is not included in color used in a normal presentation screen, or the like, as color of the laser light, the color of the laser light is not erroneously recognized. Therefore, also in the case where a laser pointer is used as the pointer, the image projection device of the present invention can correctly recognize an input instruction from the user. Note that a cross-sectional shape of laser light emitted from the laser pointer is not limited to a circle, and may be a star shape, a cross shape, a triangle, or the like. By this means, the image data extracting unit can easily perform processing of judging existence of the pointer.

Further, while, in the above-described embodiment and the modified example illustrated in FIG. 8, a case has been described where the projection unit and the imaging unit are provided within a housing of the computer body, the projection unit and the imaging unit may be provided within a housing different from the housing of the computer body. In this case, by a communication unit and a communication control unit being provided at each of the housing in which the projection unit and the imaging unit are provided and the housing of the computer body, it is possible to perform wireless data communication between the projection unit and the imaging unit, and the control unit. Typically, the projection unit and/or the imaging unit may be provided within a housing different from a housing in which the control unit is provided.

Further, while, in the above-described embodiment and the modified example illustrated in FIG. 8, a case has been described where a frame is pictured in each image projected on the projection screen by the projection unit, it is not always necessary that a frame is pictured in each image projected on the projection screen by the projection unit. Further, instead of a frame being pictured in each image, for example, predetermined marks may be pictured at four corners of each image projected on the projection screen by the projection unit. In this case, the reference data generating unit recognizes positions of the marks in the image in the imaging range on the basis of the image data obtained by the imaging unit and sets data relating to the recognized positions of the marks as reference data.

Further, in the image projection device in the above-described embodiment and the modified example illustrated in FIG. 8, it is possible to omit a table on which a screen is placed and a liquid crystal display unit. Still further, while a case has been described in the above-described embodiment where the imaging unit is adjusted so as to come into focus within a range of 10 mm in a front-back direction from the projection screen along the vertical direction of the projection screen, and a case has been described in the modified example illustrated in FIG. 8 where the imaging unit is adjusted so as to come into focus within a range of 15 mm in a front-back direction from the projection screen along the vertical direction of the projection screen, a range in which the imaging unit comes into focus is not limited to a range of 10 mm or 15 mm in a front-back direction from the projection screen along the vertical direction of the projection screen, and may be, for example, a range of approximately 50 mm in a front-back direction from the projection screen along the vertical direction of the projection screen. The imaging unit is adjusted so as to come into focus within a range of a predetermined distance in a front-back direction from the projection screen along the vertical direction of the projection screen. Typically, if the predetermined distance is small, while accuracy for discerning content of operation is improved, it becomes difficult for a user to perform operation. Meanwhile, if the predetermined distance is large, while operability improves for the user, accuracy for discerning content of operation decreases. In order to improve accuracy for discerning content of operation and improve operability, it is preferable that the above-described predetermined distance is approximately between 5 mm to 25 mm in a case of a rear-projection type image projection device and approximately between 10 mm and 50 mm in a case of a front-projection type image projection device. In the rear-projection type image projection device, because the imaging unit images an image from a back side of the projection screen, the image data extracting unit needs to extract image data in which the finger or the pointer with which operation is performed on the projection screen exists and in which a surface of the finger or the pointer on a side facing the projection screen is brought into focus. In this case, for example, if the user performs tap operation with the index finger, it is considered that a finger pad in the index finger moves from the surface of the projection screen by approximately between 5 mm and 25 mm. Therefore, in the rear-projection type image projection device, it is preferable that the above-described predetermined distance is approximately between 5 mm and 25 mm. In contrast to this, in the front-projection type image projection device, because the imaging unit images an image from the surface side of the projection screen, the image data extracting unit needs to extract image data in which the finger or the pointer with which operation is performed on the projection screen exists and in which a surface of the finger or the pointer on a side opposite to a side facing the projection screen is brought into focus. For example, in the case where the user performs tap operation with the index finger, given that a thickness of the finger at a nail portion of the index finger is approximately between 5 mm and 15 mm, the above-described predetermined distance is only required to be set at approximately between 10 mm and 40 mm. Further, in the front-projection type image projection device, because the finger, or the like, with which operation is performed is located on the same side as the side of the projection unit, it is considered that accuracy for discerning content of operation decreases compared to the rear-projection type image projection device. Therefore, in the front-projection type image projection device, there is a case where it would be better for the user to perform operation with overaction using the finger, or the like. Given that operation is performed with overaction in such a manner, it is preferable that the above-described predetermined distance is approximately 50 mm. In addition, in the case where a size of the projection screen is large, and, for example, a long pointing stick is used as the pointer, in both the rear-projection type image projection device and the front-projection type image projection device, it is preferable that the above-described predetermined distance is approximately 100 mm.

Further, while, in the above-described embodiment and the modified example illustrated in FIG. 8, a case has been described where the imaging unit is adjusted to come into focus within a range of a predetermined distance in a front-back direction from the projection screen along the vertical direction of the projection screen, a center of the range in which the imaging unit comes into focus does not necessarily have to be located on the projection screen. For example, in the rear-projection type image projection device, a position away from the projection screen to a rear side by a distance x/2 along the vertical direction of the projection screen is set as the center of the range in which the imaging unit comes into focus, and the imaging unit may be adjusted so as to come into focus within a range of the distance x/2 in a front-back direction from the center along the vertical direction of the projection screen. That is, in this case, the range in which the imaging unit comes into focus becomes a range of a distance x from the projection screen to a rear side along the vertical direction of the projection screen. Further, in the front-projection type image projection device, a position away from the projection screen to a front side by a distance x/2 along the vertical direction of the projection screen is set as the center of the range in which the imaging unit comes into focus, and the imaging unit may be adjusted so as to come into focus within a range of the distance x/2 in a front-back direction from the center along the vertical direction of the projection screen. That is, in this case, the range in which the imaging unit comes into focus becomes a range within the distance x from the projection screen to a front side along the vertical direction of the projection screen.

While, in the above-described embodiment and the modified example illustrated in FIG. 8, a case has been described where the image projection device of the present invention is incorporated into the computer terminal, the image projection device of the present invention can be incorporated into various kinds of equipment. For example, the image projection device of the present invention can be provided at a mobile terminal such as a smartphone and a mobile phone, a wristwatch, a car, a television, or the like.

Figure 9A:
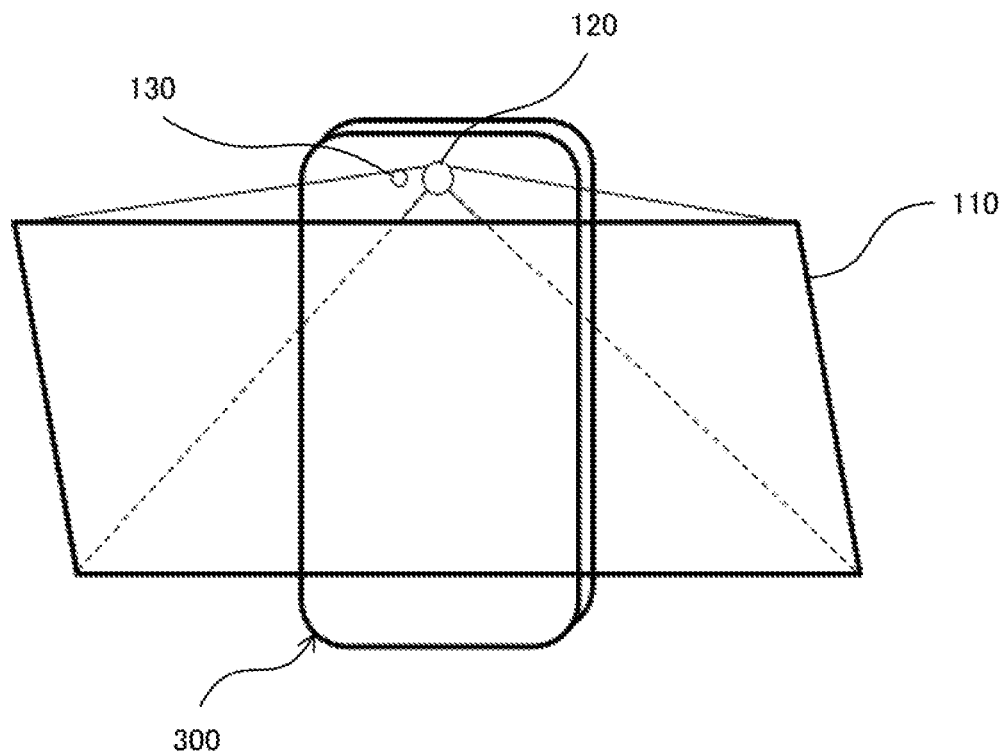
FIG. 9A is a schematic perspective view of a smartphone in which the image projection device of the present invention is provided and FIG. 9B is a schematic side view of the smartphone.
Figure 9B:
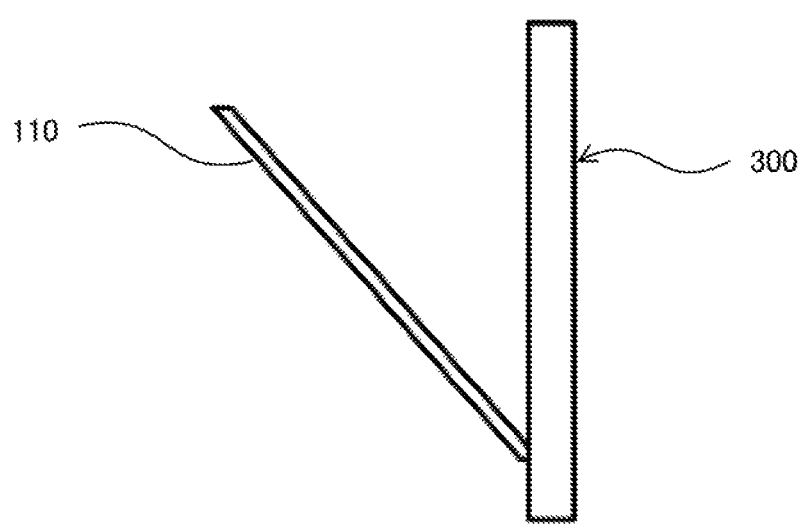

FIG. 9A is a schematic perspective view of a smartphone in which the image projection device of the present invention is provided, and FIG. 9B is a schematic side view of the smartphone. In the case where the image projection device of the present invention is applied to a smartphone 300, the projection unit 120 and the imaging unit 130 are provided at an upper end portion of the smartphone 300 so as to be adjacent to each other as illustrated in FIG. 9A, and the projection screen 110 is attached at a lower portion of the smartphone 300 in a state where the projection screen 110 is tilted as illustrated in FIG. 9B. The projection screen 110 is a rear projection screen for displaying an image by projection light being irradiated from a back side of the projection screen 110. Further, the control unit and the storage unit of the image projection device of the present invention are incorporated into the smartphone 300. When the projection unit 120 displays an image of a menu screen from the back side of the projection screen 110, the user gives an input instruction by performing operation on the menu screen from the surface side of the projection screen 110 with the finger or the pointer.

Figure 10A:
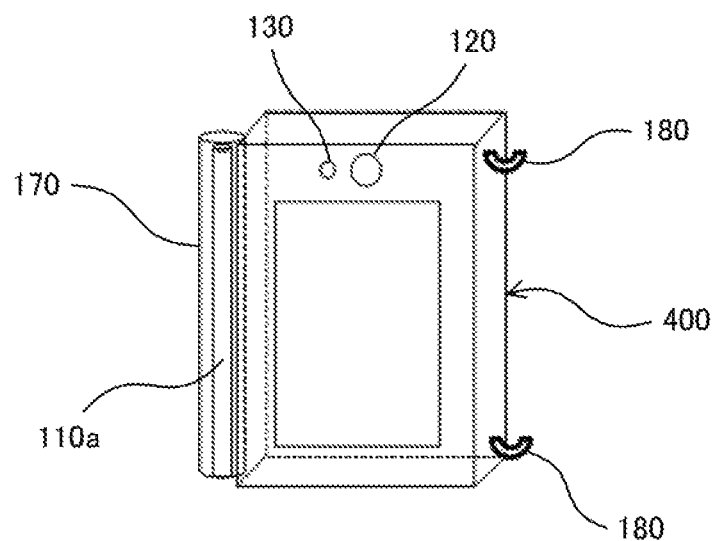
FIG. 10A is a schematic perspective view of a wristwatch in which the image projection device of the present invention is provided and FIG. 10B is a diagram illustrating how a projection screen is provided at the wristwatch.
Figure 10B:
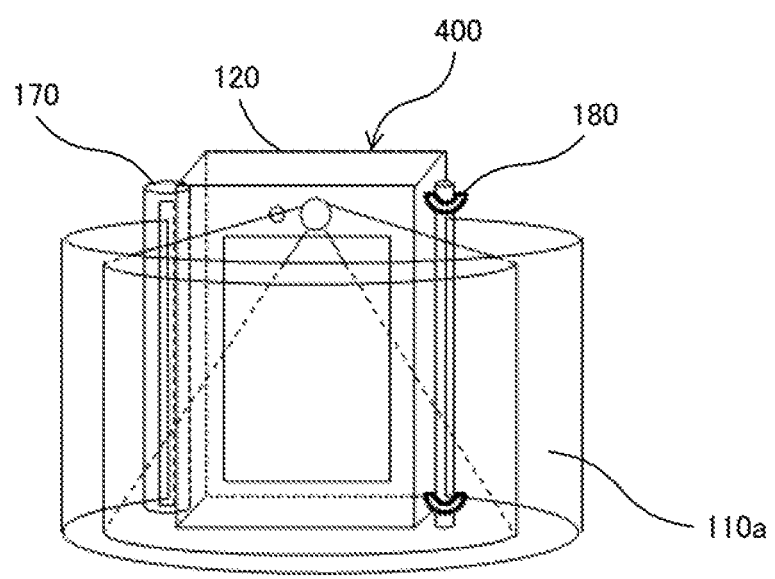

FIG. 10A is a schematic perspective view of a wristwatch in which the image projection device of the present invention is provided, and FIG. 10B is a diagram illustrating how a projection screen is provided at the wristwatch. In FIG. 10, a body portion of the wristwatch 400 is displayed, and a watchband is omitted. The wristwatch 400 to which the image projection device of the present invention is applied has a function as an information terminal. The control unit and the storage unit of the image projection device of the present invention are incorporated into the wristwatch 400. Further, the projection unit 120 and the imaging unit 130 are provided at an upper end portion on the surface of the wristwatch 400 as illustrated in FIG. 10A. The projection screen 110a is a roll-type projection screen, and stored in a screen storage unit 170. The screen storage unit 170 is provided at a left end portion of the wristwatch 400. At a right end portion of the wristwatch 400, hooks 180, 180 for hanging the projection screen 110a are provided. When the image projection device of the present invention is used, as illustrated in FIG. 10B, the user draws the projection screen 110a from the screen storage unit 170 and hangs the projection screen 110a on the hooks 180, 180, so that the projection screen 110a is placed so as to cover a surface of the wristwatch 400. When the projection unit 120 displays an image of a menu screen from the back side of the projection screen 110a, the user gives an input instruction by performing operation on the menu screen from a surface side of the projection screen 110a with the finger or the pointer.

Figure 11A:
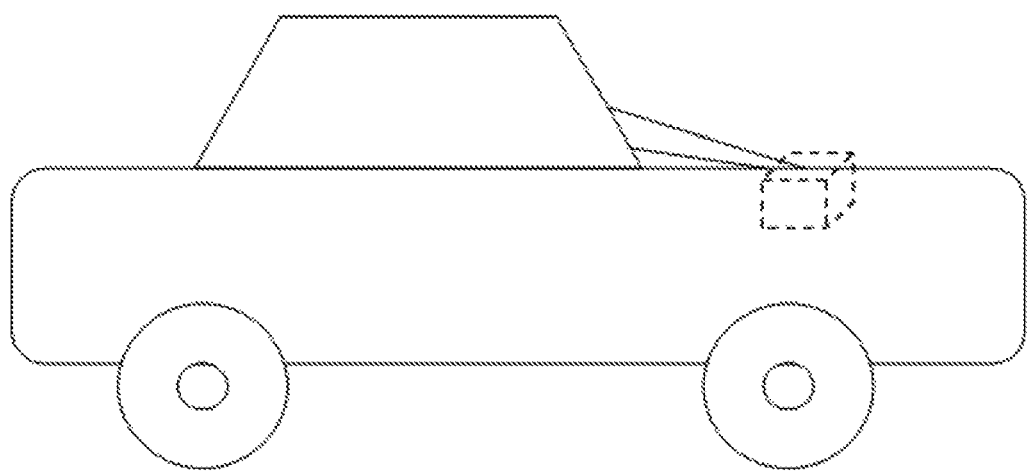
FIG. 11A is a diagram illustrating an example of a car in which a rear-projection type image projection device of the present invention is provided and FIG. 11B is a diagram illustrating an example of a car in which a front-projection type image projection device of the present invention is provided.
Figure 11B:
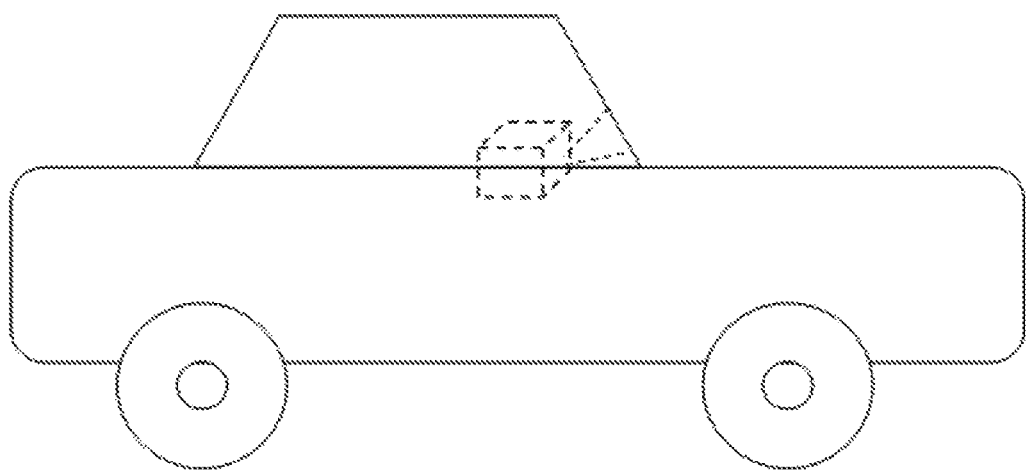

Further, there are various application methods in the case where the image projection device of the present invention is applied to a car. For example, there can be a method in which the projection unit, the imaging unit, the control unit and the storage unit in the image projection device of the present invention are incorporated into an engine room, or the like, of the car, and the projection unit projects a screen to be projected on a windshield of a car body (projection screen), a method in which the projection unit, the imaging unit, the control unit and the storage unit in the image projection device of the present invention are incorporated into a dashboard portion of the car, and the projection unit projects a screen to be projected on a control panel (projection screen), or the like. In these methods, the image projection device of the present invention is used as a rear-projection type image projection device. FIG. 11A illustrates an example of a car in which the rear-projection type image projection device is provided. Further, there can be a method in which the projection unit, the imaging unit, the control unit and the storage unit in the image projection device of the present invention are incorporated into a dashboard portion, an interior ceiling portion, or the like, of the car, and the projection unit projects a screen to be projected on a windshield of a car body (projection screen). In this method, the image projection device of the present invention is used as a front-projection type image projection device. FIG. 11B illustrates an example of a car in which the front-projection type image projection device of the present invention is provided.

Figure 12:
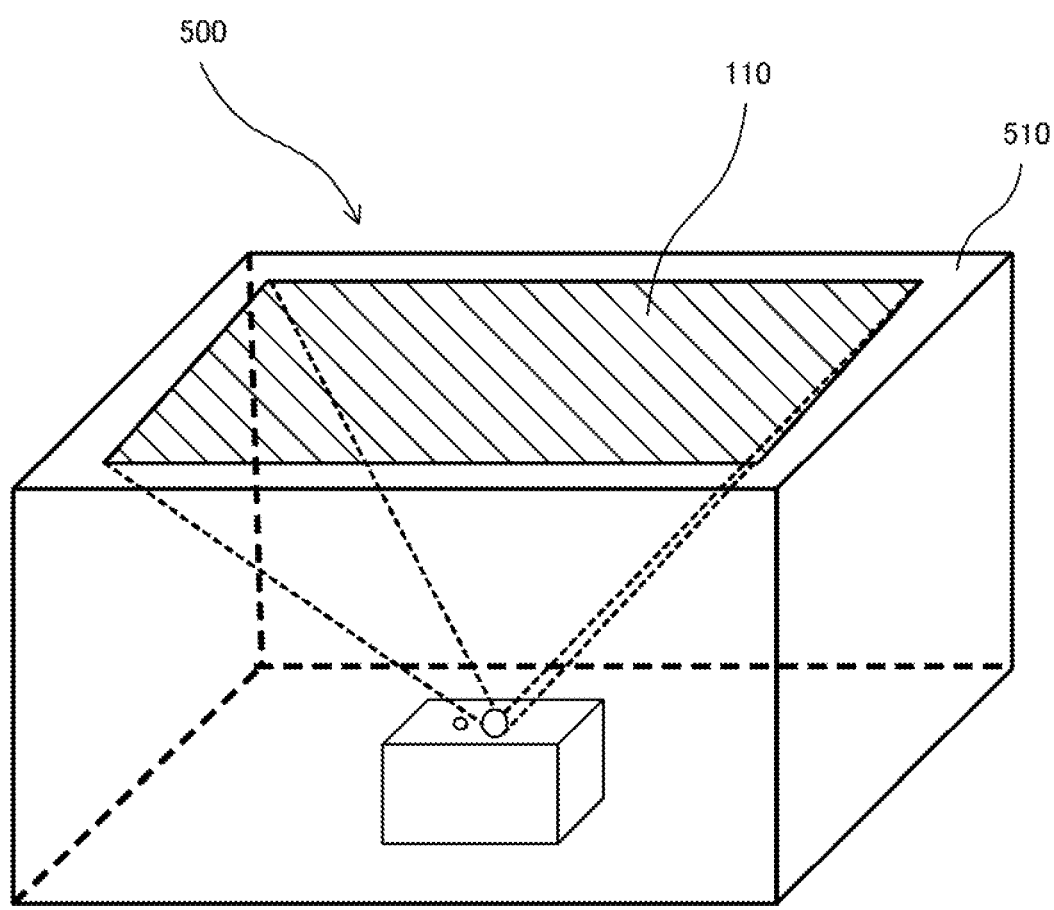
FIG. 12 is a diagram illustrating an example of a desk in which the image projection device of the present invention is provided.
Figure 13A:
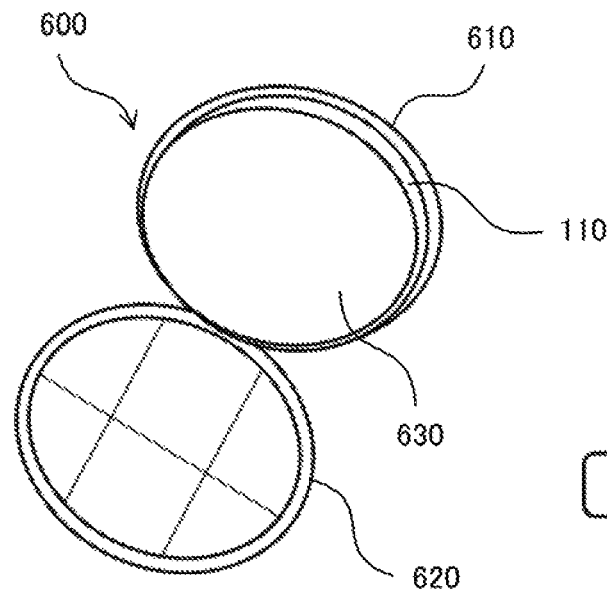
FIG. 13 is a diagram illustrating an example of a compact mirror in which the image projection device of the present invention is provided.
Figure 13B:
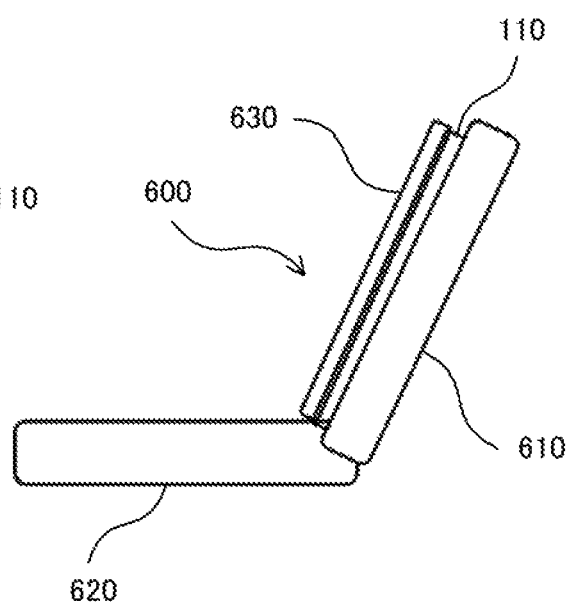
Figure 13C:
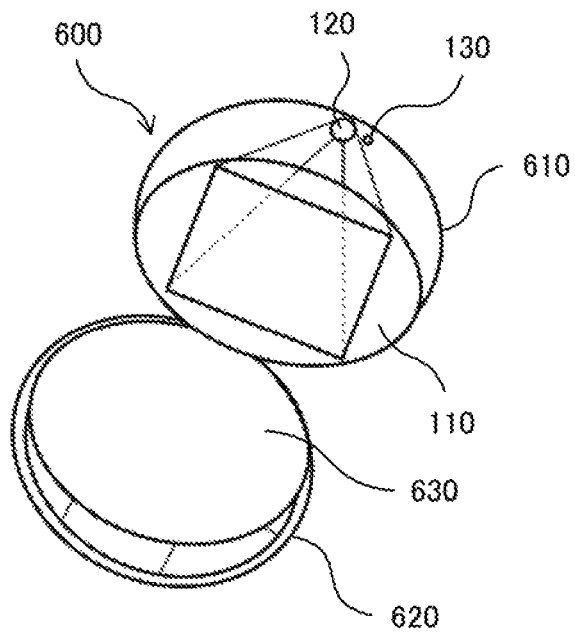
Figure 13D:
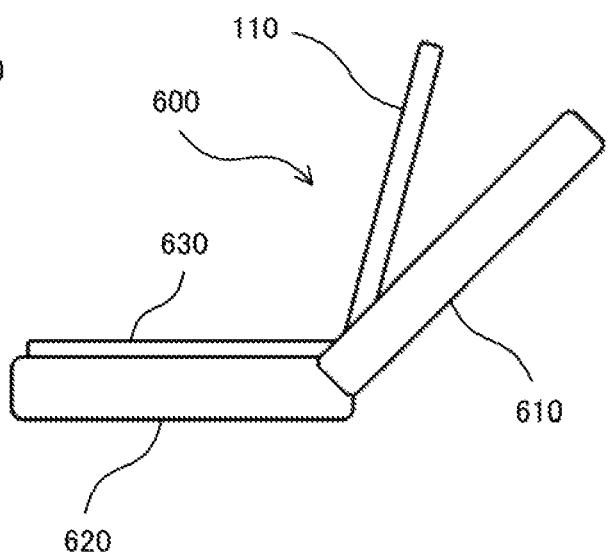

Further, the image projection device of the present invention can be incorporated into even a device such as a desk or a table used in daily life, in the case where the device has a function as a terminal. FIG. 12 illustrates an example of a desk 500 in which the image projection device of the present invention is provided. In this case, the projection screen 110 is provided on a top board 510 of the desk 500, and the projection unit, the imaging unit, the control unit and the storage unit are disposed at a lower side of the top board 510. Then, FIG. 13 illustrates an example of a compact mirror 600 in which the image projection device of the present invention is provided. Here, FIG. 13A is a schematic perspective view of the compact mirror when the minor is used, FIG. 13B is a schematic side view of the compact mirror when the mirror is used, FIG. 13C is a schematic perspective view of the compact mirror when an image is projected, and FIG. 13D is a schematic side view of the compact mirror when the image is projected. The compact mirror 600 has a function as an information terminal, and, as illustrated in FIG. 13, includes an upper cover 610, a lower cover 620, a mirror 630 and the image projection device of the present invention. The projection unit 120, the imaging unit 130, the control unit and the storage unit of the image projection device of the present invention are incorporated into the upper cover 610. As illustrated in FIG. 13A and FIG. 13B, the projection screen 110 is disposed on a back side of the mirror 630. As illustrated in FIG. 13C and FIG. 13D, by the minor 630 being tilted forward and the projection screen 110 being separated from the upper cover 610, the image projection device of the present invention can be used.

INDUSTRIAL APPLICABILITY

As described above, in the image projection device of the present invention, the imaging unit has a function of focusing, and the image data extracting unit extracts image data in which the finger or the pointer with which the user performs operation on the image projected on the projection screen exists and in which the finger or the pointer is brought into focus, in the image data obtained by the imaging unit. Therefore, for example, by the imaging unit being adjusted so as to come into focus within a range of a predetermined short distance in a front-back direction from the projection screen along the vertical direction of the projection screen, because the image data extracted by the image data extracting unit includes only image data in which the finger or the pointer exists in the vicinity of the projection screen, the operation determining unit can correctly discern content of operation by determining the content of the operation performed with the finger or the pointer on the basis of the image data extracted by the image data extracting unit. Therefore, the image projection device of the present invention is preferably used while being incorporated into various kinds of equipment, machine or devices such as a computer terminal, a mobile terminal, a wristwatch, a car and a television.

DESCRIPTION OF THE REFERENCE NUMERAL 1, 1a computer terminal
10 computer body
20 liquid crystal display unit
30 touch panel
100, 100a image projection device
110, 110a, 1100 projection screen
120 projection unit
130 imaging unit
131 camera unit
132 image processing unit
133 camera control unit
133a autofocus control unit
140 control unit
141 display control unit
142 reference data generating unit
143 image data extracting unit
144 position data generating unit
145 operation determining unit
146 input control unit
150 storage unit
160 table on which screen is placed
161a, 161b base portion
162 pole portion
163 concave portion
170 screen storage unit
180 hook
200 character input screen
210 keyboard image
220 display region
230 outer frame
300 smartphone
400 wristwatch
500 desk
510 top board
600 compact mirror
610 upper cover
620 lower cover
630 minor

The invention claimed is:

1. An image projection device having a transmission type projection screen configured to display an image by projection light being irradiated from a back side of the projection screen and a projection unit configured to project and display a predetermined image on the projection screen from the back side of the projection screen, recognizing content of an input instruction corresponding to touch operation when a user performs tap operation or double-tap operation as the touch operation on an image projected on the projection screen from a surface side of the projection screen using a finger of the user or a pointer and projecting an image in accordance with the recognized content of the input instruction on the projection screen, the image projection device comprising:

an imaging unit having a visible light camera with a function of focusing, and configured to image the image projected on the projection screen from the back side of the projection screen using the visible light camera to acquire the visible light image data, wherein the visible light camera is disposed so that the optical axis of the visible light camera and the normal direction of the projection screen are substantially parallel to each other and is adjusted so as to come into focus within a range of a predetermined distance from the projection screen to the surface side of the projection screen along a vertical direction of the projection screen, the predetermined distance being a distance between 5 mm and 100 mm;

a reference data generating unit configured to generate reference data for specifying a position and a size of the image projected on the projection screen in an imaging range of the imaging unit on the basis of the visible light image data acquired by the imaging unit;

an image data extracting unit configured to extract the visible light image data in which a finger or a pointer with which a user performs operation on the image projected on the projection screen exists and in which the finger or the pointer is brought into focus in the visible light image data obtained by the imaging unit and associate time data relating to time at which the visible light image data is captured with the visible light image data, wherein the visible light image data extracted by the image data extracting unit includes only visible light image data in which the finger or the pointer exists within the predetermined distance from the projection screen along a vertical direction of the projection screen;

a position data generating unit configured to generate position data for specifying a position of the finger or the pointer in the imaging range of the imaging unit on the basis of the visible light image data extracted by the image data extracting unit and associate the generated position data with the visible light image data;

an operation determining unit configured to determine content of operation performed with the finger or the pointer on the basis of the position data and the time data associated with each piece of the visible light image data for a series of pieces of the visible light image data extracted in chronological order by the image data extracting unit; and an input control unit configured to recognize content of an input instruction corresponding to the operation performed with the finger or the pointer on the basis of the content of the operation determined by the operation determining unit, the position data generated by the position data generating unit and the reference data generated by the reference data generating unit, and control the projection unit to project an image in accordance with the recognized content of the input instruction on the projection screen, wherein in a case where the operation determining unit recognizes that after the visible light image data in which the position of the finger or the pointer remains virtually unchanged is extracted for a predetermined period, the visible light image data in which the finger or the pointer exists at substantially the same position is extracted for the predetermined period again before a certain period of time has elapsed, the operation determining unit determines that the double-tap operation is performed with the finger or the pointer, and in a case where the operation determining unit recognizes that after the visible light image data in which the position of the finger or the pointer remains virtually unchanged is extracted for the predetermined period, the visible light image data in which the finger or the pointer exists at substantially the same position is not extracted before the period of time has elapsed, the operation determining unit determines that the tap operation is performed with the finger or the pointer.

2. The image projection device according to claim 1, wherein a frame is pictured in each image projected on the projection screen or predetermined marks are pictured at four corners of each image projected on the projection screen, the reference data generating unit recognizes a position of the frame or the marks of the image in an imaging range of the imaging unit on the basis of the visible light image data obtained by the imaging unit and sets data relating to the recognized position of the frame or the marks as reference data.

3. The image projection device according to claim 1, wherein when the user performs operation on the image from a surface side of the projection screen with a finger or a pointer, the image data extracting unit recognizes a shape, or a shape and color corresponding to the finger or the pointer in the visible light image data captured through the projection screen, and acquires the visible light image data in which the recognized shape or shape and color exists as the visible light image data in which the finger or the pointer with which the user performs operation on the image exists.

4. The image projection device according to claim 1, wherein when the user perform operation on the image while bringing a finger or a pointer into contact with the image from a surface side of the projection screen, the image data extracting unit recognizes change of a shape, change of color or change of a shape and color of the finger or the pointer when the finger or the pointer is brought into contact with the projection screen in the visible light image data captured through the projection screen and acquires the visible light image data in which the recognized change of a shape, change of color, or change of a shape and color exists as the visible light image data in which the finger or the pointer with which the user performs operation on the image exists.

5. The image projection device according to claim 1, wherein in a case where a laser pointer which emits laser light is used as the pointer, when the user performs operation on the image projected on the projection screen by irradiating laser light from the laser pointer on the projection screen, the image data extracting unit recognizes a shape and/or color of the laser light from the laser pointer in the visible light image data obtained by the imaging unit and acquires the visible light image data in which the recognized shape and/or color of the laser light exists as the visible light image data in which the finger or the pointer with which the user performs operation on the image exists.

6. The image projection device according to claim 1, further comprising:

a table on which a screen is placed for attaching the projection screen so that a distance between the projection screen and the projection unit and a distance between the projection screen and the imaging unit are respectively maintained at substantially fixed distances.

7. The image projection device according to claim 1, wherein the reference data generating unit, the image data extracting unit, the position data generating unit, the operation determining unit and the input control unit are provided within one housing, and the projection unit and/or the imaging unit are provided within a housing different from the housing.

8. A computer terminal, a wristwatch, a mobile terminal or a car comprising the image projection device according to claim 1.

9. The image projection device according to claim 1, wherein the range which can be imaged by the imaging unit is the whole projection screen.

10. The image projection device according to claim 1, wherein
the image data extracting unit performs processing of excluding data concerning an image which is currently projected on the projection screen on the visible light image data obtained by the imaging unit and judges whether the finger or the pointer exists on the basis of the visible light image data subjected to the processing.

11. An image projection device having a projection screen configured to display an image by projection light being irradiated from a surface side of the projection screen and a projection unit configured to project and display a predetermined image on the projection screen from the surface side of the projection screen, recognizing content of an input instruction corresponding to touch operation when a user performs tap operation or double-tap operation as the touch operation on an image projected on the projection screen from the surface side of the projection screen using a finger of the user or a pointer and projecting an image in accordance with the recognized content of the input instruction on the projection screen, the image projection device comprising:
  an imaging unit having a visible light camera with a function of focusing, and configured to image the image projected on the projection screen from the surface side of the projection screen using the visible light camera to acquire the visible light image data, wherein
    the visible light camera is disposed so that the optical axis of the visible light camera and the normal direction of the projection screen are substantially parallel to each other and is adjusted so as to come into focus within a range of a predetermined distance from the projection screen to the surface side of the projection screen along a vertical direction of the projection screen, the predetermined distance being a distance between 5 mm and 100 mm;
  a reference data generating unit configured to generate reference data for specifying a position and a size of the image projected on the projection screen in an imaging range of the imaging unit on the basis of the visible light image data acquired by the imaging unit;
  an image data extracting unit configured to extract the visible light image data in which a finger or a pointer with which a user performs operation on the image projected on the projection screen exists and in which the finger or the pointer is brought into focus in the visible light image data obtained by the imaging unit and associate time data relating to time at which the visible light image data is captured with the visible light image data, wherein
    the visible light image data extracted by the image data extracting unit includes only the visible light image data in which the finger or the pointer exists within the predetermined distance from the projection screen along a vertical direction of the projection screen;
  a position data generating unit configured to generate position data for specifying a position of the finger or the pointer in the imaging range of the imaging unit on the basis of the visible light image data extracted by the image data extracting unit and associate the generated position data with the visible light image data;
  an operation determining unit configured to determine content of operation performed with the finger or the pointer on the basis of the position data and the time data associated with each piece of the visible light image data for a series of pieces of the visible light image data extracted in chronological order by the image data extracting unit; and
  an input control unit configured to recognize content of an input instruction corresponding to the operation performed with the finger or the pointer on the basis of the content of the operation determined by the operation determining unit, the position data generated by the position data generating unit and the reference data generated by the reference data generating unit, and control the projection unit to project an image in accordance with the recognized content of the input instruction on the projection screen, wherein
    in a case where the operation determining unit recognizes that after the visible light image data in which the position of the finger or the pointer remains virtually unchanged is extracted for a predetermined period, the visible light image data in which the finger or the pointer exists at substantially the same position is extracted for the predetermined period again before a certain period of time has elapsed, the operation determining unit determines that the double-tap operation is performed with the finger or the pointer, and
    in a case where the operation determining unit recognizes that after the visible light image data in which the position of the finger or the pointer remains virtually unchanged is extracted for the predetermined period, the visible light image data in which the finger or the pointer exists at substantially the same position is not extracted before the period of time has elapsed, the operation determining unit determines that the tap operation is performed with the finger or the pointer.

12. The image projection device according to claim 11, wherein a frame is pictured in each image projected on the projection screen or predetermined marks are pictured at four corners of each image projected on the projection screen, the reference data generating unit recognizes a position of the frame or the marks of the image in an imaging range of the imaging unit on the basis of the visible light image data obtained by the imaging unit and sets data relating to the recognized position of the frame or the marks as reference data.

13. The image projection device according to claim 11, wherein, in a case where a laser pointer which emits laser light is used as the pointer, when the user performs operation on the image projected on the projection screen by irradiating laser light from the laser pointer on the projection screen, the image data extracting unit recognizes a shape and/or color of the laser light from the laser pointer in the visible light image data obtained by the imaging unit and acquires the visible light image data in which the recognized shape and/or color of the laser light exists as the visible light image data in which the finger or the pointer with which the user performs operation on the image exists.

14. The image projection device according to claim 11, wherein
the reference data generating unit, the image data extracting unit, the position data generating unit, the operation determining unit and the input control unit are provided within one housing, and the projection unit and/or the imaging unit are provided within a housing different from the housing.

15. A computer terminal, a wristwatch, a mobile terminal or a car comprising the image projection device according to claim 11.

16. The image projection device according to claim 11, wherein the range which can be imaged by the imaging unit is the whole projection screen.

17. The image projection device according to claim 11, wherein
the image data extracting unit performs processing of excluding data concerning an image which is currently projected on the projection screen on the visible light image data obtained by the imaging unit and judges whether the finger or the pointer exists on the basis of the visible light image data subjected to the processing.

* * * * *